United States Patent
Mori et al.

(10) Patent No.: US 12,143,286 B2
(45) Date of Patent: Nov. 12, 2024

(54) NETWORK MONITORING DEVICE, NETWORK MONITORING METHOD, AND NETWORK MONITORING PROGRAM

(71) Applicant: Nippon Telegraph and Telephone Corporation, Tokyo (JP)

(72) Inventors: Hiroki Mori, Musashino (JP); Satoshi Nakatsukasa, Musashino (JP); Ken Takahashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/014,531

(22) PCT Filed: Jul. 6, 2020

(86) PCT No.: PCT/JP2020/026500
§ 371 (c)(1),
(2) Date: Jan. 5, 2023

(87) PCT Pub. No.: WO2022/009294
PCT Pub. Date: Jan. 13, 2022

(65) Prior Publication Data
US 2023/0254227 A1    Aug. 10, 2023

(51) Int. Cl.
*H04L 43/0817*  (2022.01)
*H04L 41/12*    (2022.01)
*H04L 43/10*    (2022.01)

(52) U.S. Cl.
CPC .......... *H04L 43/0817* (2013.01); *H04L 41/12* (2013.01); *H04L 43/10* (2013.01)

(58) Field of Classification Search
CPC ...... H04L 43/0817; H04L 43/10; H04L 41/12
See application file for complete search history.

(56) References Cited

U.S. PATENT DOCUMENTS

| | | | |
|---|---|---|---|
| 10,158,545 B1* | 12/2018 | Marrone | H04L 41/06 |
| 10,374,956 B1* | 8/2019 | Tracy | H04L 41/0816 |
| 10,623,259 B2* | 4/2020 | Ponnuswamy | H04L 41/0866 |
| 11,700,190 B2* | 7/2023 | Yadav | G06F 16/288 |
| | | | 718/1 |
| 2017/0118041 A1* | 4/2017 | Bhattacharya | H04L 41/0895 |
| 2018/0013670 A1 | 1/2018 | Kapadia et al. | |
| 2018/0157532 A1* | 6/2018 | Kumar | G06F 9/5061 |
| 2018/0295045 A1* | 10/2018 | Bali | H04L 43/103 |

(Continued)

OTHER PUBLICATIONS

[No Author Listed] [online], "Cisco Tetration," Cicso Systems G. K., retrieved on May 28, 2020, retrieved from URL <https://www.cisco.com/c/ja_jp/products/data-center-analytics/tetration-analytics/index.html>, 47 pages (with English Translation).

*Primary Examiner* — Blake J Rubin
(74) *Attorney, Agent, or Firm* — Fish & Richardson P.C.

(57) ABSTRACT

A network monitoring apparatus sets monitoring targets that are physical interfaces included in leaf nodes and spine nodes, links connecting the leaf nodes and the spine nodes, transfer function units included in the spine nodes, and an overlay tunnel set between the originating-side leaf node on the terminating-side leaf node, aggregates monitoring results at the respective monitoring targets, and determines the failure type of a failure and the degree of influence of the failure on the basis of the type of the monitoring target in which the failure has occurred and the occurring event.

6 Claims, 17 Drawing Sheets

(56) References Cited

U.S. PATENT DOCUMENTS

| | | |
|---|---|---|
| 2018/0351821 A1* | 12/2018 | Nagarajan ............. H04L 41/122 |
| 2018/0367392 A1 | 12/2018 | Harnega et al. |
| 2018/0367412 A1* | 12/2018 | Sethi ....................... H04L 43/20 |
| 2019/0207839 A1 | 7/2019 | Arneja et al. |
| 2019/0363965 A1* | 11/2019 | Tewari ................. H04L 43/028 |
| 2020/0007583 A1* | 1/2020 | Dixit ..................... H04L 63/102 |
| 2020/0210261 A1* | 7/2020 | Reddy ..................... G06F 21/70 |
| 2020/0274773 A1* | 8/2020 | Mortsolf ............. G06F 3/04815 |
| 2020/0304406 A1* | 9/2020 | Thubert .............. H04L 49/1515 |
| 2021/0036935 A1* | 2/2021 | Patwardhan ............ H04L 47/11 |
| 2022/0006701 A1* | 1/2022 | Patel ....................... H04L 41/22 |

* cited by examiner

Fig. 6

|  | REGULAR FAILURE | IRREGULAR FAILURE |
|---|---|---|
| REDUNDANT ZONE | LOW INFLUENCE | CHECK REQUIRED |
| NON-REDUNDANT ZONE | HIGH INFLUENCE | CHECK REQUIRED |

Fig. 11

| No | REFERENCE DESTINATION EVENT | OCCURRING EVENT | |
|---|---|---|---|
| | PHYSICAL IF PAIR STATUS | EVENT DETECTED DURING AGGREGATION | EVENT NAME | FAILURE TYPE |
| 1 | up | ping FAILED (SILENT FAILURE) | ping FAILED DUE TO SILENT FAILURE | IRREGULAR FAILURE |
| 2 | down | ping FAILED (PHYSICAL IF FAILURE) | ping FAILED DUE TO PHYSICAL IF FAILURE | OTHER-FACTOR FAILURE |
| 3 | IF DIFFERENCE | ping FAILED (PHYSICAL IF FAILURE) | ping FAILED DUE TO PHYSICAL IF FAILURE | OTHER-FACTOR FAILURE |
| 4 | UNKNOWN | ping FAILED (CAUSE UNKNOWN) | ping FAILED | UNIDENTIFIABLE |
| 5 | MONITORING OFF | ping FAILED (LOWER MONITORING OFF) | ping FAILED | UNIDENTIFIABLE |

Fig. 12

| No | REFERENCE DESTINATION EVENT (EVENT DETECTED DURING MONITORING) ||| OCCURRING EVENT || FAILURE TYPE |
|---|---|---|---|---|---|---|
| | ORIGINATING-SIDE INTERNAL LINK | TERMINATING-SIDE INTERNAL LINK || EVENT DETECTED DURING AGGREGATION | EVENT NAME | |
| | PHYSICAL IF PAIR STATUS / ping COMMUNICATION STATUS | PHYSICAL IF PAIR STATUS | ping COMMUNICATION STATUS | | | |
| 1 | up / SUCCEEDED | up | SUCCEEDED | traceroute FAILED (TRANSIT ABNORMALITY) | traceroute FAILED DUE TO TRANSIT ABNORMALITY IN Spine | IRREGULAR FAILURE |
| 2 | up / SUCCEEDED | up | FAILED | traceroute FAILED (SILENT FAILURE) | traceroute FAILED DUE TO SILENT FAILURE | OTHER-FACTOR FAILURE |
| 3 | up / SUCCEEDED | down / IF DIFFERENCE | (ANY) | traceroute FAILED (PHYSICAL FAILURE) | traceroute FAILED DUE TO PHYSICAL IF FAILURE | OTHER-FACTOR FAILURE |
| 4 | up / SUCCEEDED | UNKNOWN | UNKNOWN | traceroute FAILED (CAUSE UNKNOWN) | traceroute FAILED | UNIDENTIFIABLE |
| 5 | up / SUCCEEDED | up | (ANY) | traceroute FAILED (CAUSE UNKNOWN) | traceroute FAILED | UNIDENTIFIABLE |
| 6 | up / FAILED | (ANY) | (ANY) | traceroute FAILED (SILENT FAILURE) | traceroute FAILED DUE TO SILENT FAILURE | OTHER-FACTOR FAILURE |
| 7 | down / IF DIFFERENCE | (ANY) | (ANY) | traceroute FAILED (PHYSICAL FAILURE) | traceroute FAILED DUE TO PHYSICAL IF FAILURE | OTHER-FACTOR FAILURE |
| 8 | up / UNKNOWN | (ANY) | (ANY) | traceroute FAILED (CAUSE UNKNOWN) | traceroute FAILED | UNIDENTIFIABLE |
| 9 | UNKNOWN / (ANY) | (ANY) | (ANY) | traceroute FAILED (CAUSE UNKNOWN) | traceroute FAILED | UNIDENTIFIABLE |
| 10 | (ANY) / MONITORING OFF | (ANY) | MONITORING OFF | traceroute FAILED (LOWER MONITORING OFF) | traceroute FAILED | UNIDENTIFIABLE |
| 11 | MONITORING OFF / (ANY) | MONITORING OFF | (ANY) | traceroute FAILED (LOWER MONITORING OFF) | traceroute FAILED | UNIDENTIFIABLE |

Fig. 13

| No | REFERENCE DESTINATION EVENT (EVENT DETECTED DURING MONITORING) ||| OCCURRING EVENT || FAILURE TYPE |
| | TERMINATING-SIDE PHYSICAL IF PAIR || VXLAN OAM ZONE | | | |
| | PHYSICAL IF PAIR STATUS | ping COMMUNICATION STATUS | traceroute COMMUNICATION STATUS | EVENT DETECTED DURING AGGREGATION | EVENT NAME | |
|---|---|---|---|---|---|---|
| 1 | up | SUCCEEDED/SKIPPED | SUCCEEDED | VXLAN OAM FAILED (VXLAN UNCONFIGURED) | VXLAN COMMUNICATION FAILED DUE TO VXLAN UNCONFIGURED IN DESTINATION Leaf | IRREGULAR FAILURE |
| 2 | up | SUCCEEDED/SKIPPED | FAILED | VXLAN OAM FAILED (TRANSIT ABNORMALITY) | VXLAN COMMUNICATION FAILED DUE TO TRANSIT ABNORMALITY IN Spine | OTHER-FACTOR FAILURE |
| 3 | up | SUCCEEDED/SKIPPED | UNKNOWN | VXLAN OAM FAILED (CAUSE UNKNOWN) | VXLAN COMMUNICATION FAILED | UNIDENTIFIABLE |
| 4 | up | FAILED | (ANY) | VXLAN OAM FAILED (SILENT FAILURE) | VXLAN COMMUNICATION FAILED DUE TO SILENT FAILURE | OTHER-FACTOR FAILURE |
| 5 | down/IF DIFFERENCE | (ANY) | (ANY) | VXLAN OAM FAILED (PHYSICAL FAILURE) | VXLAN COMMUNICATION FAILED DUE TO PHYSICAL IF FAILURE | OTHER-FACTOR FAILURE |
| 6 | up | UNKNOWN | (ANY) | VXLAN OAM FAILED (CAUSE UNKNOWN) | VXLAN COMMUNICATION FAILED | UNIDENTIFIABLE |
| 7 | UNKNOWN | (ANY) | (ANY) | VXLAN OAM FAILED (CAUSE UNKNOWN) | VXLAN COMMUNICATION FAILED | UNIDENTIFIABLE |
| 8 | (ANY) | (ANY) | MONITORING OFF | VXLAN OAM FAILED (LOWER MONITORING OFF) | VXLAN COMMUNICATION FAILED | UNIDENTIFIABLE |
| 9 | (ANY) | MONITORING OFF | (ANY) | VXLAN OAM FAILED (LOWER MONITORING OFF) | VXLAN COMMUNICATION FAILED | UNIDENTIFIABLE |
| 10 | MONITORING OFF | (ANY) | (ANY) | VXLAN OAM FAILED (LOWER MONITORING OFF) | VXLAN COMMUNICATION FAILED | UNIDENTIFIABLE |

Fig. 14

| No | EVENT DETECTED DURING MONITORING ||||||
|---|---|---|---|---|---|---|
| | ORIGINATING-SIDE PHYSICAL IF PAIR || TERMINATING-SIDE PHYSICAL IF PAIR || traceroute COMMUNICATION STATUS | VXLAN OAM COMMUNICATION STATUS |
| | PHYSICAL IF PAIR STATUS | ping COMMUNICATION STATUS | PHYSICAL IF PAIR STATUS | ping COMMUNICATION STATUS | | |
| 1 | down/IF DIFFERENCE | SUCCEEDED | (ANY) | (ANY) | (ANY) | (ANY) |
| 2 | down/IF DIFFERENCE | (ANY) | (ANY) | (ANY) | SUCCEEDED | (ANY) |
| 3 | down/IF DIFFERENCE | (ANY) | (ANY) | (ANY) | (ANY) | SUCCEEDED |
| 4 | (ANY) | (ANY) | down/IF DIFFERENCE | SUCCEEDED | (ANY) | (ANY) |
| 5 | (ANY) | (ANY) | down/IF DIFFERENCE | (ANY) | SUCCEEDED | (ANY) |
| 6 | (ANY) | (ANY) | down/IF DIFFERENCE | (ANY) | (ANY) | SUCCEEDED |
| 7 | up | FAILED | (ANY) | (ANY) | SUCCEEDED | (ANY) |
| 8 | up | FAILED | (ANY) | (ANY) | (ANY) | SUCCEEDED |
| 9 | (ANY) | (ANY) | up | FAILED | SUCCEEDED | (ANY) |
| 10 | (ANY) | (ANY) | up | FAILED | (ANY) | SUCCEEDED |
| 11 | (ANY) | (ANY) | (ANY) | (ANY) | FAILED | SUCCEEDED |
| 12 | up | SKIPPED | (ANY) | (ANY) | (ANY) | SUCCEEDED |
| 13 | (ANY) | (ANY) | up | SKIPPED | (ANY) | (ANY) |
| 14 | up | (ANY) | (ANY) | (ANY) | SKIPPED | (ANY) |

NETWORK MONITORING DEVICE, NETWORK MONITORING METHOD, AND NETWORK MONITORING PROGRAM

CROSS-REFERENCE TO RELATED APPLICATIONS

This application is a National Stage application under 35 U.S.C. § 371 of International Application No. PCT/JP2020/026500, having an International Filing Date of Jul. 6, 2020, the disclosure of which is considered part of the disclosure of this application, and is incorporated by reference in its entirety into this application.

TECHNICAL FIELD

The present invention relates to a network monitoring apparatus, a network monitoring method, and a network monitoring program for monitoring a communication network.

BACKGROUND ART

In conventional communication networks that require large transfer capacities, chassis-type devices having large capacities and sophisticated functions are adopted. A chassis-type device is characteristically capable of monitoring the state of the device and the normality of communications passing through the device in a closed manner, and detecting failures and abnormalities with ease.

However, a chassis-type device is normally expensive, and is not suitable in a network such as a data center that has poor scalability and is subject to drastic demand fluctuations. Therefore, in place of chassis-type devices, a fabric network including inexpensive devices such as a plurality of general-purpose switches and white boxes is adopted more often these days. A fabric network virtually regards a plurality of devices including leaf nodes serving as line cards of a chassis-type device and spine nodes serving as switch cards as a transfer base, and forms a logical network on that base. With this configuration, the fabric network can realize "scale-out" at low cost in response to a network demand, while achieving the same transfer performance and routing functions as those of a large-scale device.

CITATION LIST

Non Patent Literature

Non Patent Literature 1: "Cisco Tetration", [online], Cisco, [Searched on Jun. 18, 2020], Internet <URL:https://www.cisco.com/c/ja jp/products/data-center-analytics/tetration-analytics/index.html>

SUMMARY OF INVENTION

Technical Problem

Since a fabric network regards a network including a plurality of devices as one base, it is necessary to check the normality of the fabric network as the base. At such a point of time, the respective devices performing monitoring equivalent to that by a conventional chassis-type device are not sufficient.

For example, even in a case where an interface of a device has broken down, and the device becomes unable to communicate, a detour is possible as long as there is some redundancy in the network, and therefore, the devices as the transfer base do not affect communications. It is not possible to determine normality of the transfer base simply by grasping the state of each device in the above manner.

Furthermore, since the respective devices perform monitoring independently of one another, it might be difficult to identify the location of a failure, because the single failure is detected by the respective devices performing monitoring and making a large number of notifications.

Non Patent Literature 1 mentioned above relates to a technology of monitoring communication in a logical network or between applications by burying information for monitoring in packets using dedicated hardware. By this technology, however, monitoring can be performed only with a unique function or a combination of specific products. Furthermore, according to Non Patent Literature 1, only a single device is to be monitored, and monitoring equivalent to that by a conventional chassis-type device cannot be performed.

The present invention has been made in view of such aspects, and aims to enable normality monitoring and influence determination at a time of a failure like a chassis-type device, even in a fabric network that includes leaf nodes and spine nodes.

Solution to Problem

A network monitoring apparatus according to the present invention is a network monitoring apparatus that monitors a communication network including a plurality of leaf nodes, a plurality of spine nodes, and links connecting the leaf nodes and the spine nodes. The network monitoring apparatus includes: a network configuration management unit that generates network configuration information about the communication network; a monitoring target setting unit that sets a plurality of types of monitoring targets in the communication network, on the basis of the network configuration information; a monitoring execution unit that issues a monitoring execution instruction with respect to each of the monitoring targets, and collects monitoring results; and a failure determination unit that aggregates the monitoring results from the respective monitoring targets, and determines the failure type of a failure and the degree of influence of the failure, on the basis of the type of the monitoring target having the failure and an occurring event. The monitoring target setting unit sets the monitoring targets, which are physical interfaces included in the leaf nodes and the spine nodes, the links connecting the leaf nodes and the spine nodes, transfer function units included in the spine nodes, and an overlay tunnel set between the originating-side leaf node and the terminating-side leaf node.

Advantageous Effects of Invention

According to the present invention, normality monitoring and influence determination at a time of a failure can be performed like a chassis-type device, even in a fabric network.

BRIEF DESCRIPTION OF DRAWINGS

FIG. 6 is a table showing examples of determination of the degree of influence of a failure.

FIG. 11 is a table illustrating a method for determining the failure cause event when ping communication has failed.

FIG. 12 is a table illustrating a method for determining the failure cause event when traceroute communication has failed.

FIG. 13 is a table illustrating a method for determining the failure cause event when VXLAN OAM communication has failed.

FIG. 14 is a table showing example states in which there is an inconsistency in monitoring results.

DESCRIPTION OF EMBODIMENTS

Next, an embodiment (hereinafter referred to as the "present embodiment") for carrying out the present invention is described. First, an overall configuration according to the present invention is explained.
<Network Configuration>

Figure 1:
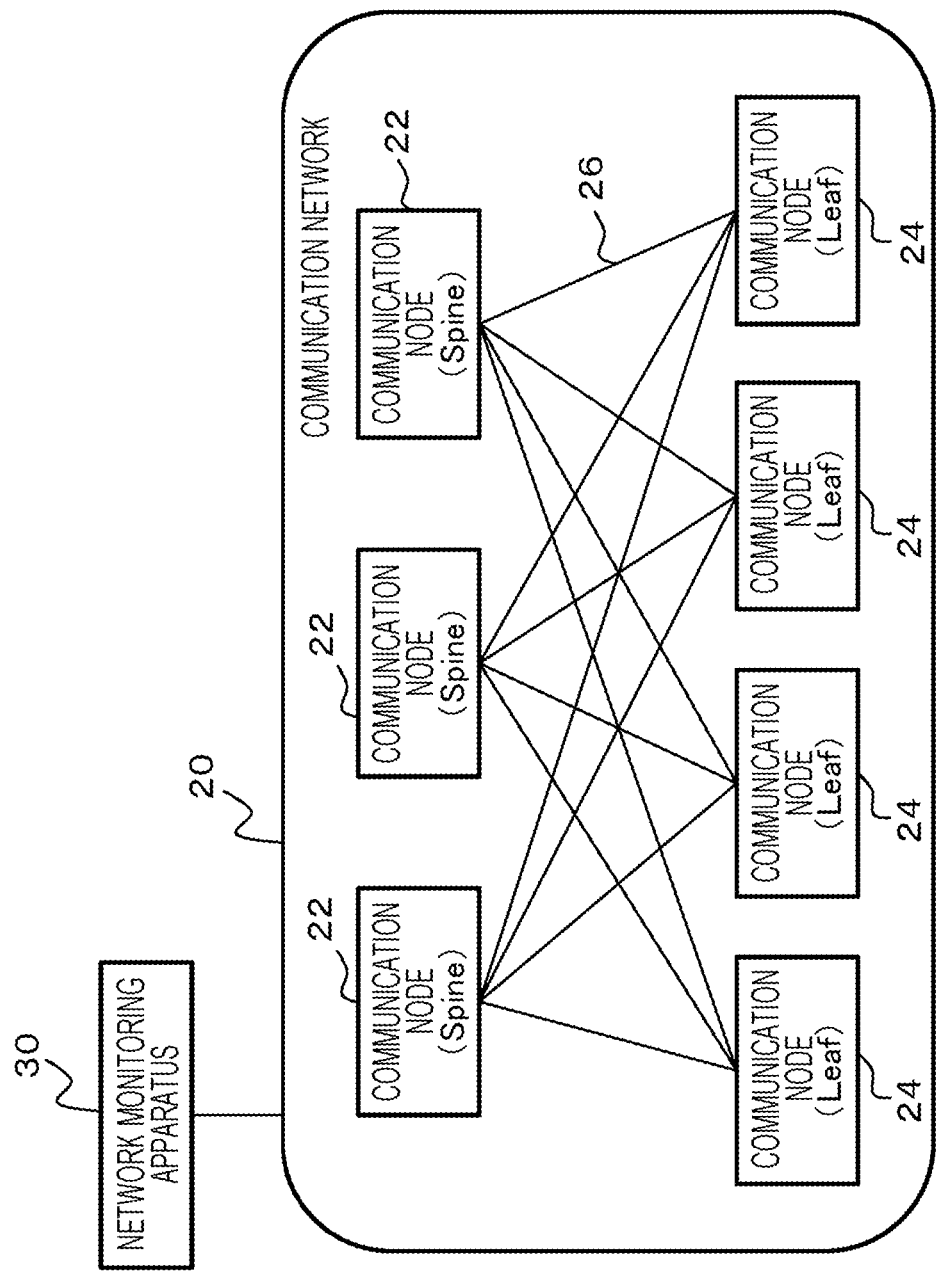
FIG. 1 is a diagram illustrating the configuration of a communication network that is monitored by a network monitoring apparatus according to the present embodiment.

FIG. 1 is a diagram illustrating the configuration of a communication network 20 that is monitored by a network monitoring apparatus 30 according to the present embodiment.

The network monitoring apparatus 30 according to the present embodiment sets the communication network 20 as a monitoring target.

The communication network 20 is a fabric network that includes a plurality of communication nodes (hereinafter referred to as "spine nodes") 22 functioning as spine nodes, a plurality of communication nodes (hereinafter referred to as "leaf nodes") 24 functioning as leaf nodes, and physical links 26 connecting these nodes. Each spine node 22 is connected to all the leaf nodes 24 in the communication network 20 by the links 26. Although not shown in the drawing, the network monitoring apparatus 30 and each of the communication nodes 22 and 24 are connected to each other, and can exchange results of monitoring of targets as described later.
<Network Monitoring Apparatus 30>

Figure 2:
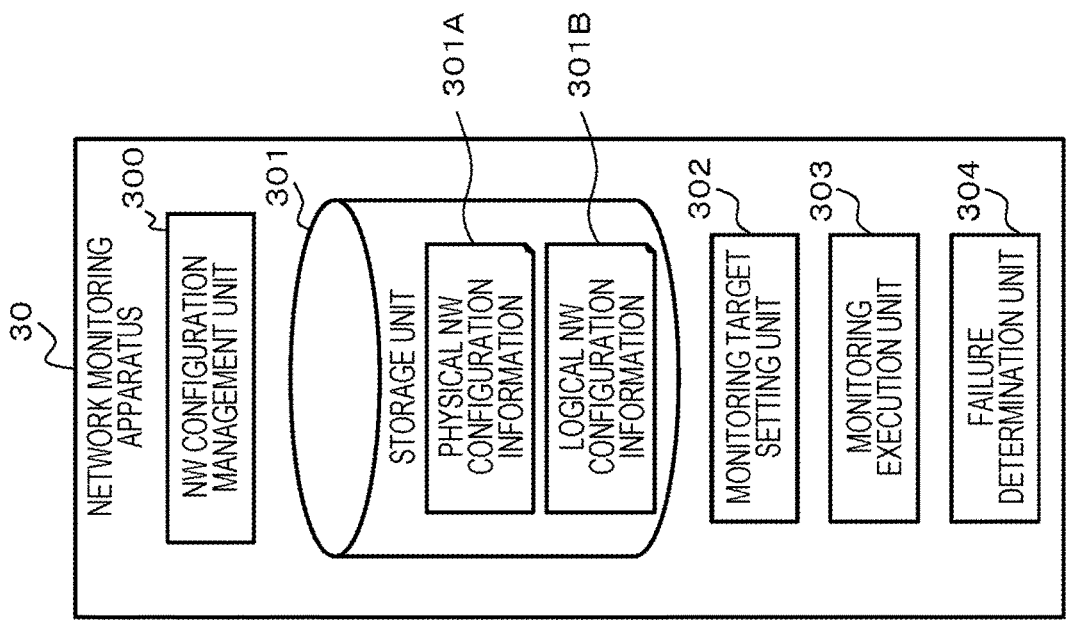
FIG. 2 is a block diagram illustrating the functional configuration of the network monitoring apparatus.

FIG. 2 is a block diagram illustrating the functional configuration of the network monitoring apparatus 30.

The network monitoring apparatus 30 is formed with one or a plurality of computers 900 (FIG. 17) functioning as the respective functional units shown in FIG. 2.

The network monitoring apparatus 30 includes a network (shown as "NW" in the drawings) configuration management unit 300, a storage unit 301, a monitoring target setting unit 302, a monitoring execution unit 303, and a failure determination unit 304.

The network configuration management unit 300 generates network configuration information about the communication network 20.

In the present embodiment, a routing protocol such as Open Shortest Path First (OSPF), Intermediate System to Intermediate System (IS-IS), or Border Gateway Protocol (BGP) is operating in the communication network 20, and route information and logical network information can be acquired. Also, each of the communication nodes 22 and 24 can acquire the connection statuses of the links 26 by Link Layer Discovery Protocol (LLDP) or the like. Note that the present invention can also be applied to a communication network in which information cannot be obtained with a routing protocol or through access to each of the communication nodes 22 and 24.

The network configuration management unit 300 acquires the network topology and delay information by accessing the routing protocol and the respective communication nodes 22 and 24, and generates network configuration information.

Note that network configuration information may be manually input to the network configuration management unit 300.

The storage unit 301 stores the network configuration information generated by the network configuration management unit 300. The storage unit 301 stores physical network configuration information 301A, logical network configuration information 301B, and the like, for example, as the network configuration information.

The monitoring target setting unit 302 sets a plurality of types of monitoring targets in the communication network 20, on the basis of the network configuration information.

Figure 3:
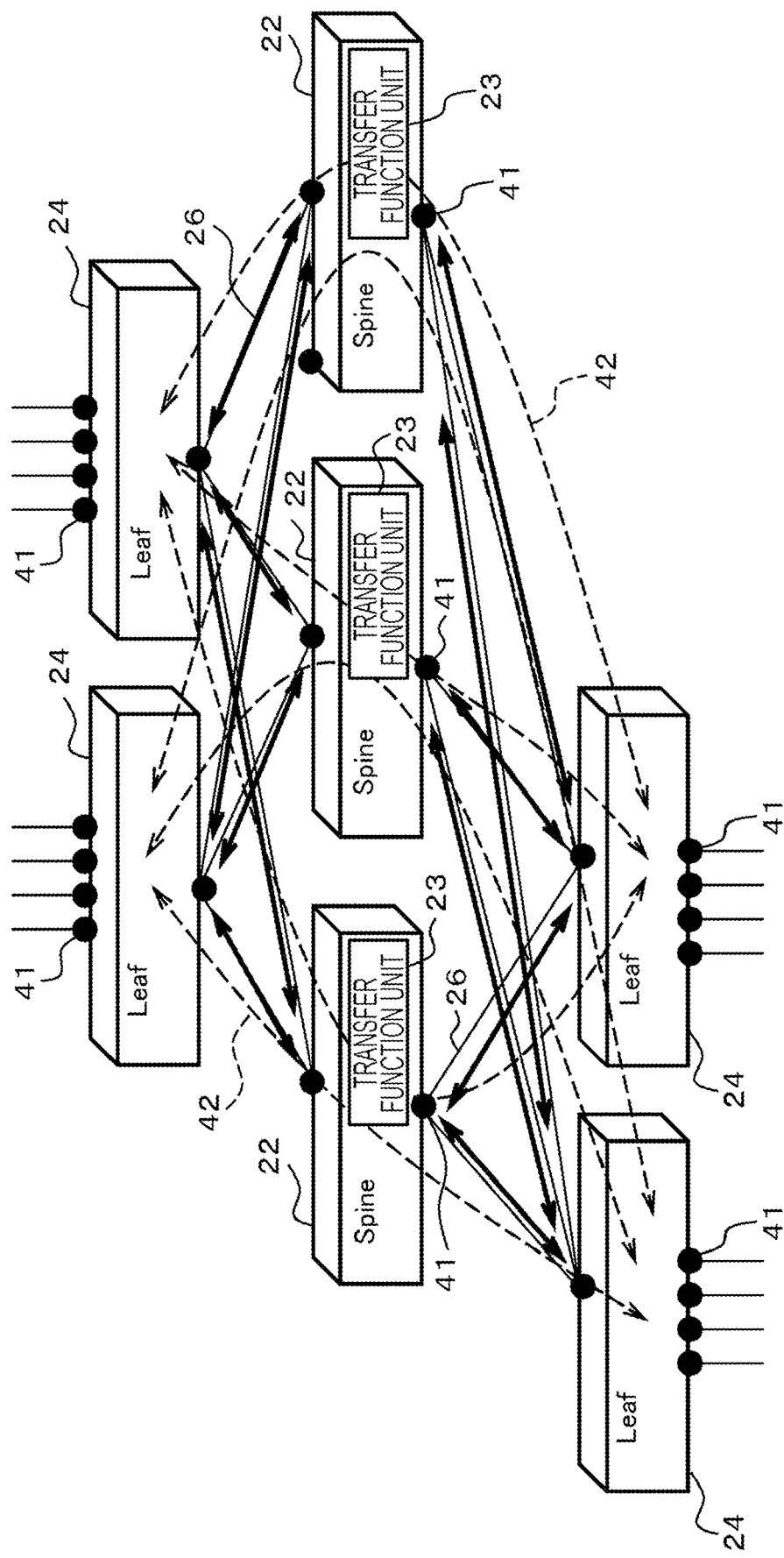
FIG. 3 is a diagram illustrating monitoring targets in the communication network.

FIG. 3 is a diagram illustrating monitoring targets in the communication network 20.

As illustrated in FIG. 3, the monitoring target setting unit 302 sets the four locations mentioned below as the monitoring targets in the communication network 20.
[First Monitoring Target] Physical Interfaces (IFs) 41 in the Leaf Nodes 24 and the Spine Nodes 22: Solid Black Circles in FIG. 3

The physical interfaces 41 that are the first monitoring target corresponds to user-network interfaces (UNIs) or internal wiring connecting points in a chassis-type device.
[Second Monitoring Target] Leaf-Spine Links (the Links 26) Connecting the Leaf Nodes 24 and the Spine Nodes 22: Solid Double-Headed Arrows in FIG. 3

The links 26 as the second monitoring target corresponds to internal wiring lines in a chassis-type device.
[Third Monitoring Target] Transfer Function Units 23 in the Spine Nodes 22

The transfer function units 23 as the third monitoring target corresponds to switch cards in a chassis-type device.
[Fourth Monitoring Target] Overlay Tunnels 42 Set Between the Leaf Nodes 24: Dashed Double-Headed Arrows in FIG. 3

The overlay tunnels 42 as the fourth monitoring target corresponds to a logical network such as Virtual Routing and Forwarding (VRF) or VXLAN Network Identifier (VNI).

Note that the overlay tunnels 42 are to be monitored only in cases where they are set in the communication network 20.

The monitoring execution unit 303 issues an instruction (monitoring execution instruction) to perform monitoring on each of the monitoring targets set by the monitoring target setting unit 302, and collects monitoring results.

Figure 4:
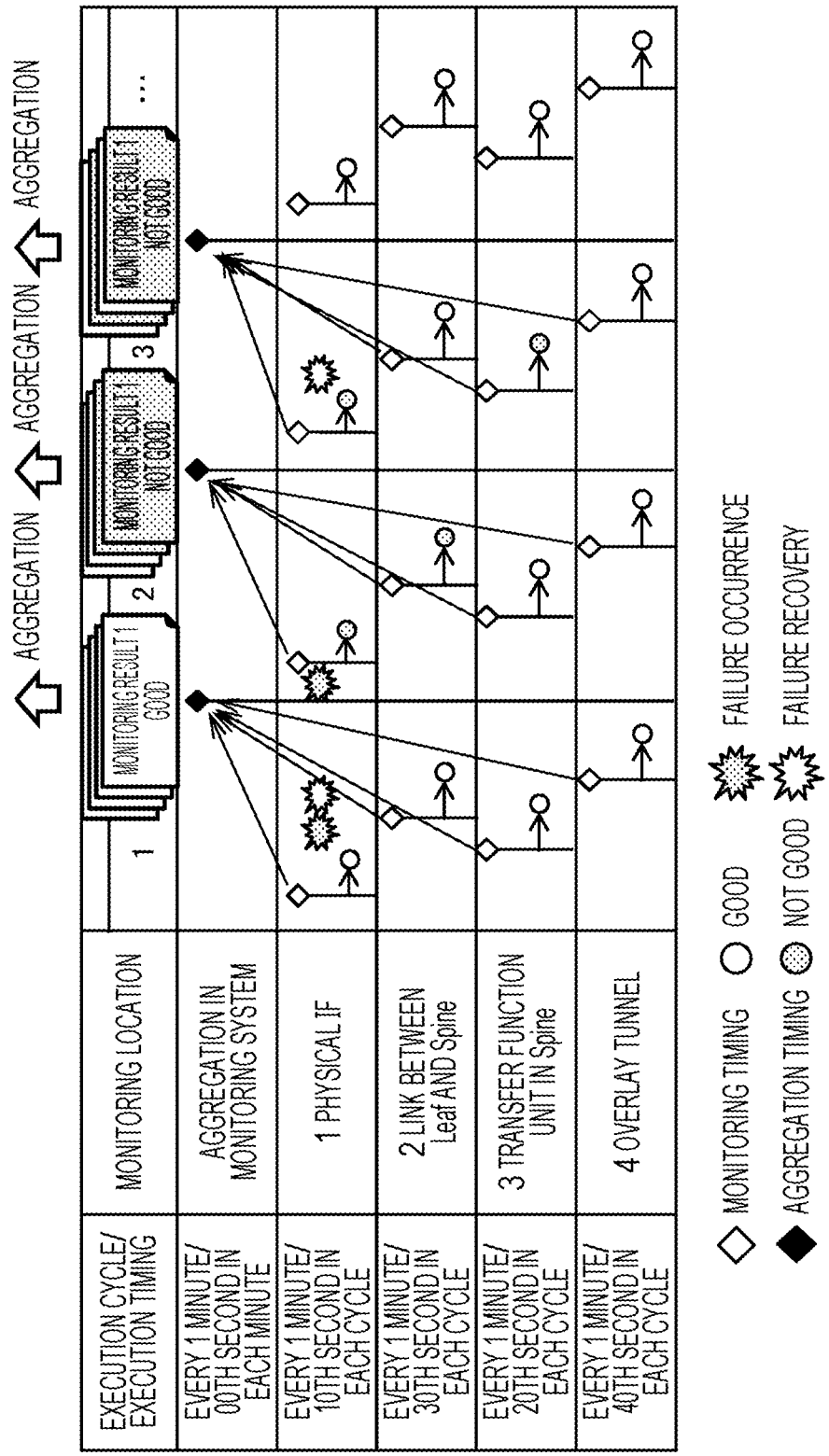
FIG. 4 is an explanatory diagram illustrating the relationship between monitoring cycles and collection cycles.

The monitoring execution unit 303 issues a monitoring execution instruction in every predetermined monitoring cycle, and in the present embodiment, a monitoring cycle and a monitoring timing are individually set for each of the first to fourth monitoring targets (see FIG. 4). The monitoring execution unit 303 may instruct each device to perform monitoring in each monitoring cycle, or may instruct each device to autonomously perform monitoring in each monitoring cycle.

Monitoring of the first to fourth monitoring targets is performed by the method described below, for example. Note that the method described below is an example, and may be replaced with a method capable of acquiring equivalent information and checking statuses.

[First Monitoring Target] Physical Interfaces 41

The statuses of all the valid physical interfaces 41 in the communication network 20 are monitored by telemetry or Simple Network Management Protocol (SNMP).

[Second Monitoring Target] Leaf-Spine Links 26

As for all the links 26 directly connecting the leafs and the spines, the communication levels of the links 26 are monitored with Internet Control Message Protocol (ICMP) pings (hereinafter, simply referred to as "pings").

[Third Monitoring Target] Transfer Function Units 23 of the Spine Nodes 22

In all the transfer paths from the physical interfaces 41 of the respective leaf nodes 24 held in the transfer function units 23 to the physical interfaces 41 of the other leaf nodes 24, the communication levels in transfer processes by the transfer function units 23 are monitored with ICMP traceroutes (hereinafter, simply referred to as "traceroutes").

[Fourth Monitoring Target] Overlay Tunnels 42

As for the overlay tunnels 42 between the nodes serving as termination points, communication levels are monitored by a method for monitoring the overlay tunnels 42 (such as VXLAN Operation Administration and Maintenance (OAM) in the case of a Virtual eXtensible Local Area Network (VXLAN)).

The monitoring execution unit 303 also collects the results of monitoring of the respective monitoring targets. The monitoring execution unit 303 collects the results of monitoring of the monitoring targets from the respective devices prior to the timing of monitoring result aggregation in the failure determination unit 304 described later. Note that, in the present embodiment, the timing of collection and the timing of aggregation of monitoring results are assumed to be the same. Also, the monitoring execution unit 303 may receive monitoring results from the respective devices.

Here, the relationship between monitoring cycles and aggregation cycles is described.

As described above, the monitoring execution unit 303 issues a monitoring execution instruction in each predetermined monitoring cycle. Also, the failure determination unit 304 described later aggregates monitoring results in each predetermined aggregation cycle.

In the present embodiment, the monitoring result aggregation cycles are designed to be equal to or longer than the monitoring cycles for each monitoring target. This is because monitoring result aggregation is performed after the monitoring results of the respective monitoring targets are updated at least once.

FIG. 4 is a diagram illustrating the relationship between monitoring cycles and collection cycles.

In the example illustrated in FIG. 4, each monitoring result aggregation cycle is one minute, and an aggregation timing comes at the 00th second of each minute.

Also, monitoring cycles and monitoring timings are individually set for each of the first to fourth monitoring targets. For monitoring targets of the same type, monitoring is performed at the same timing.

Specifically, each monitoring cycle for the physical interfaces 41 as the first monitoring target is one minute, and the monitoring timing is at the 10th second of each minute. Each monitoring cycle for the links 26 as the second monitoring target is one minute, and the monitoring timing is at the 30th second of each minute. Each monitoring cycle for the transfer function units 23 of the spine nodes 22 as the third monitoring target is one minute, and the monitoring timing is at the 20th second of each minute. Each monitoring cycle for the overlay tunnels 42 as the fourth monitoring target is one minute, and the monitoring timing is at the 40th second of each minute.

That is, the aggregation periods are equal to the monitoring cycles for the first to fourth monitoring targets. As a result, it is possible to aggregate monitoring results at the timing of update of the results of monitoring of all the monitoring targets, and enhance the monitoring accuracy in the network monitoring apparatus 30 by reflecting the latest monitoring results in failure determination described later.

Figure 15:
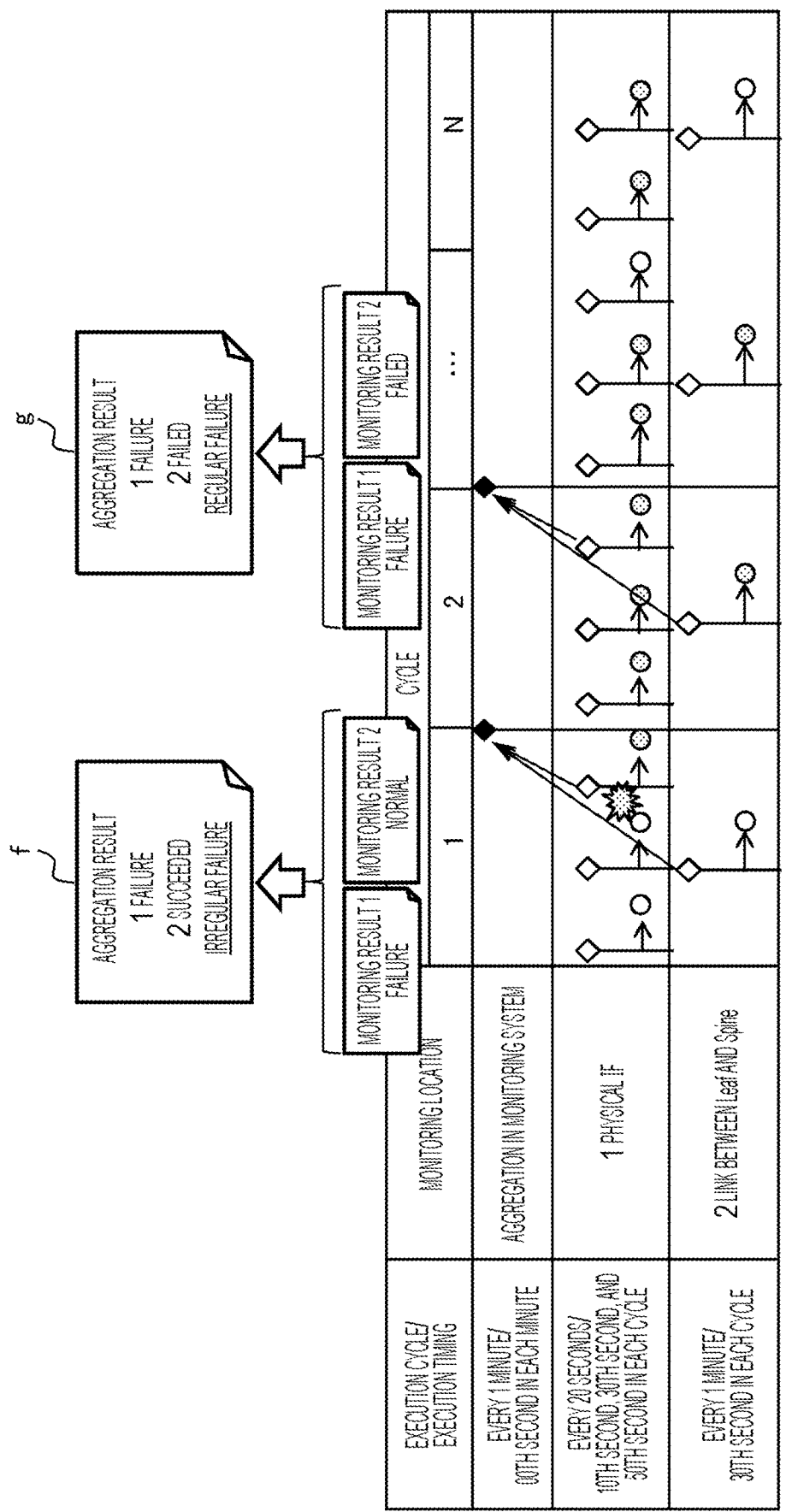
FIG. 15 is a diagram illustrating a failure determination method based on a plurality of aggregation results.

Note that, in the example illustrated in FIG. 4, the monitoring cycles for the first to fourth monitoring targets are the same (one minute). However, as illustrated in FIG. 15, for example, the monitoring cycles may vary with each of the monitoring targets.

Referring back to FIG. 2, the failure determination unit 304 aggregates the results of monitoring of the respective monitoring targets, and determines the failure type of a failure and the degree of influence of the failure on the communication network 20, on the basis of the type of the monitoring target in which the failure has occurred and the occurring event.

More specifically, the failure determination unit 304 determines 1) the location of the failure cause, 2) the failure type, and 3) the degree of influence of the failure, on the basis of the collected monitoring results.

1. Locations of Failure Causes

On the basis of the collected monitoring results and the network configuration information, the failure determination unit 304 aggregates the monitoring results from the same physical location into one notification. At this point of time, the results of monitoring of the second to fourth monitoring targets are mapped on the physical interfaces 41 (first monitoring target) serving as the starting/terminating points. By doing so, it is possible to easily grasp the location of a failure, and aggregate related failures into one notification.

For example, a failure in underlay communication or overlay communication such as a ping is determined to be a failure between the physical interfaces 41 serving as termination points. In a case where failures are detected in a plurality of layers, the result of monitoring at the location closest to the lower layer (first monitoring target>second monitoring target>third monitoring target>fourth monitoring target) is determined to be the location of the cause, and the result from the upper layer is determined to be a related alarm.

2. Failure Types

In the present embodiment, the three types of failures, which are "regular failure", "irregular failure", and "other-factor failure", are defined as failure types, and a failure type is determined from the failure detection status of each monitoring target.

A regular failure is a failure in the physical interfaces 41, disconnection of the links 26, a device failure, or the like, and is a failure that can be appropriately detected or allows switching in the device.

An irregular failure is a failure that cannot be appropriately detected in the device, such as a silent failure.

An other-factor failure is a failure that occurs due to a failure in another monitoring target, such as a ping failure due to a failure in the physical interfaces 41.

Figure 5:
FIG. 5 is a table showing examples of failure type determination.

FIG. 5 is a table showing examples of failure type determination.

For example, the first column (see reference sign a) of the table shown in FIG. 5 indicates a case where failures are detected in the physical interfaces 41 as the first monitoring target, in the links 26 as the second monitoring target, and in the transfer function units 23 of the spine nodes 22 as the third monitoring target. In this case, the failure determination unit 304 determines that the failure in the physical interfaces 41 is a regular failure, and the failures in the links 26 and the transfer function units 23 are other-factor failures caused by a failure in a lower monitoring target.

Further, the second to fourth columns (see reference sign b) of the table shown in FIG. 5 indicate a case where failures are detected independently (without any failure detected in a lower monitoring target) in the links 26 as the second monitoring target, in the transfer function units 23 of the spine nodes 22 as the third monitoring target, and in the overlay tunnels 42 as the fourth monitoring target. In this case, there is a possibility that failure detection is not properly performed, the failure determination unit 304 determines that a failure in each monitoring target is an irregular failure.

3. Degrees of Influence

In the present embodiment, three types of degrees of influence, which are "low-influence state (instantaneous interruption)", "high-influence state (full interruption)", and "check-required state (abnormal state)", are defined as degrees of influence of failures.

A low-influence state is a state in which a failure has occurred in a redundant zone, and communication paths can be switched. In a low-influence state, the communication is not affected, and it is determined that there is no need to take any immediate measures.

A high-influence state is a state in which a failure has occurred in a non-redundant zone, and communication paths cannot be switched, or is a state in which there is no redundancy (the device is isolated) due to a failure. In a high-influence state, communication is affected, and it is determined that immediate measures need to be taken.

A check-required state is a state in which an irregular failure is detected, and there is a possibility that communication is affected. In a check-required state, there is a possibility that communication is affected, and therefore, it is determined that immediate measures need to be taken.

FIG. 6 is a table showing examples of determination of the degree of influence of a failure.

In a case where a regular failure has occurred in a zone with redundancy (a redundant zone), it is determined that the degree of influence is low. In a case where a regular failure has occurred in a zone without redundancy (a non-redundant zone), on the other hand, it is determined that the degree of influence is high.

Further, in a case where an irregular failure has occurred, the state is determined to be a check-required state, regardless of whether the location of the failure is in a redundant zone or in a non-redundant zone.

Specific Examples of Failure Determination

Figure 7:
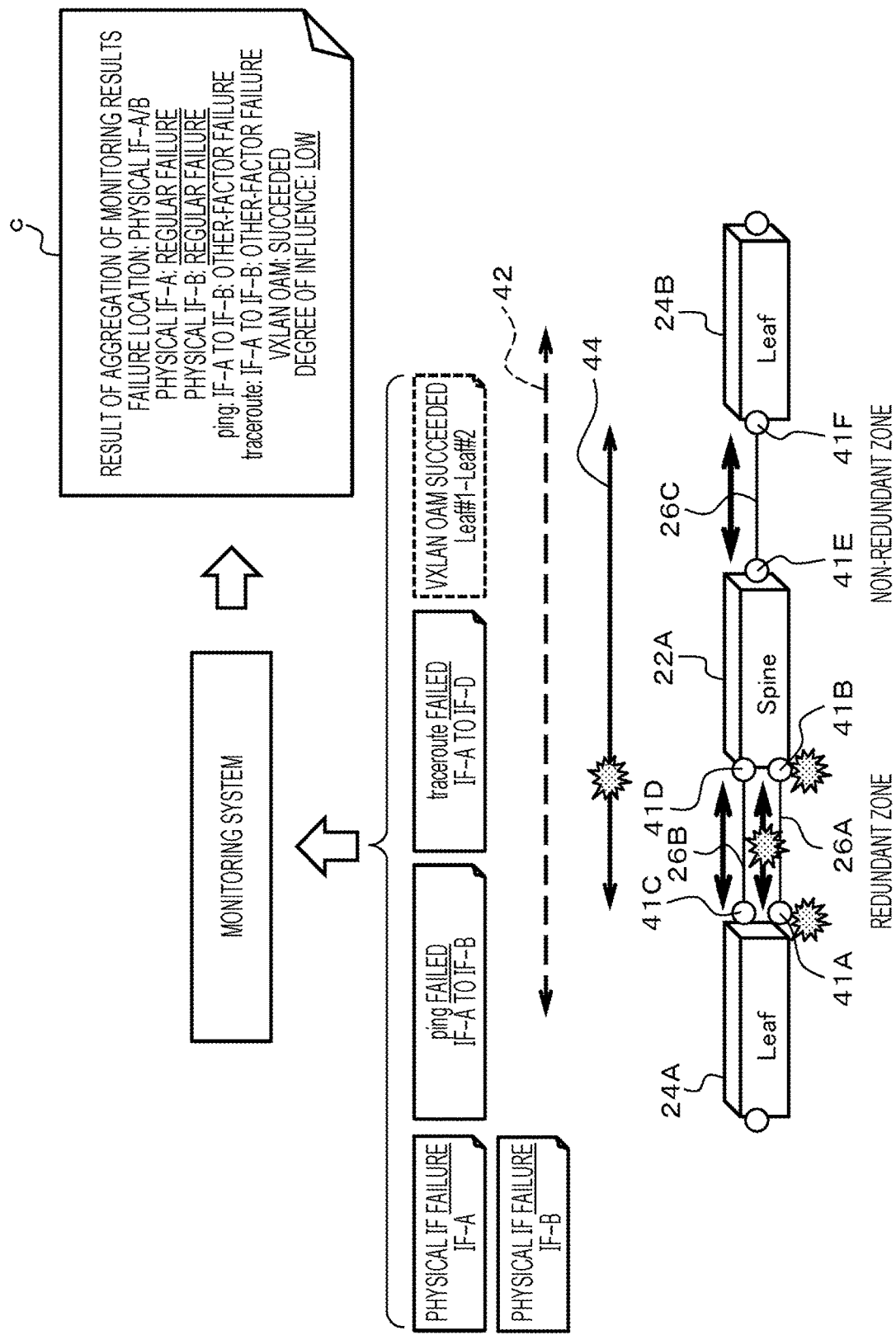
FIG. 7 is a diagram for explaining a first example failure state.

FIG. 7 is a diagram for explaining a first example failure state.

The first example failure state indicates a case where a failure has occurred in the physical interfaces 41 in a redundant zone.

The lower portion of FIG. 7 shows a connection configuration of a leaf node 24A, a spine node 22A, and a leaf node 24B. The leaf node 24A has a physical interface 41A (IF-A) and a physical interface 41C (IF-C) that face the spine node 22A. The spine node 22A has a physical interface 41B (IF-B) and a physical interface 41D (IF-D) that face the leaf node 24A, and has a physical interface 41E (IF-E) that faces the leaf node 24B. The leaf node 24B has a physical interface 41F (IF-F) that faces the spine node 22A.

The leaf node 24A and the spine node 22A are connected by a link 26A connecting the physical interface 41A and the physical interface 41B, and a link 26B connecting the physical interface 41C and the physical interface 41D, and the zone between the leaf node 24A and the spine node 22A is a redundant zone.

The spine node 22A and the leaf node 24B are connected only by a link 26C connecting the physical interface 41E and the physical interface 41F, and the zone between the spine node 22A and the leaf node 24B is a non-redundant zone.

Here, in this example case, a failure has occurred in the physical interface 41A in the redundant zone, a failure is also detected in the physical interface 41B facing the physical interface 41A, and a failure (a communication failure) is detected in the ping (the method for monitoring the link 26A as the second monitoring target) and the traceroute (the method for monitoring the transfer function unit 23 of the spine node 22A as the third monitoring target, denoted by reference numeral 44 in the drawing) between the physical interfaces 41A and 41B. Note that VXLAN OAM, which is the method for monitoring the overlay tunnel 42 (between the leaf node 24A and the leaf node 24B) as the fourth monitoring target, is successfully communicating.

In such a case, the results of aggregation of the monitoring results are as follows (see reference sign c in FIG. 7).

The failure locations are aggregated in the physical interfaces 41A and 41B. As for the failure type, since failures have been detected in the physical interfaces 41A and 41B facing each other, and the ping and the traceroute executed in the upper layer have failed, it is determined that regular failures have occurred in the physical interfaces 41A and 41B (the first monitoring target), and other-factor failures have occurred in the link 26A (the second monitoring target) and the transfer function unit 23 (the third monitoring target) of the spine node 22A accordingly.

The degree of influence of the failures is determined to be low, because communication paths are switched at the time of the failure detection, because of the redundant zone and the regular failures.

Figure 8:
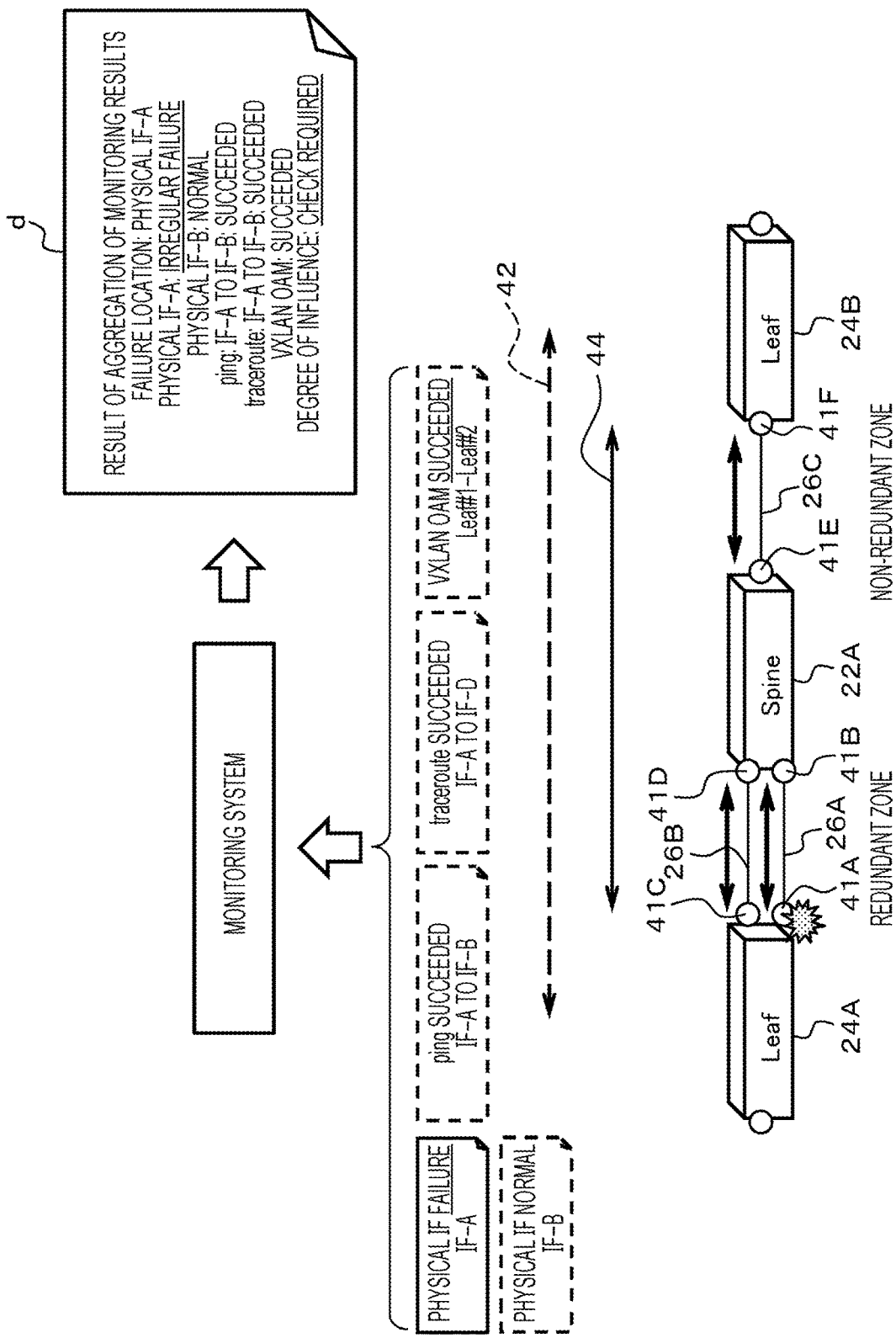
FIG. 8 is a diagram for explaining a second example failure state.

FIG. 8 is a diagram for explaining a second example failure state.

The second example failure state indicates a case where a failure is detected in one of the physical interfaces 41 facing each other in the redundant zone.

The connection configuration illustrated in FIG. 8 is the same as that in FIG. 7.

Here, a failure has occurred in the physical interface 41A in the redundant zone, and any other failure is not detected.

In such a case, the results of aggregation of the monitoring results are as follows (see reference sign d in FIG. 8).

The failure location is in the physical interface 41A. As for the failure type, since a failure is detected only in the physical interface 41A between the physical interfaces 41A and 41B facing each other, and any failure is not detected in the other interfaces (the ping in the link 26A connected to the physical interface 41A is also determined to be successful, for example), it is determined that an irregular failure that hinders proper failure detection in the physical interface 41A has occurred.

As for the degree of influence of the failure, the failure is a failure in the redundant zone, but the degree of influence of the failure is determined to be in need of checking, because the failure is an irregular failure, and it is not possible to determine whether communication paths can be properly switched because of the failure detection.

Figure 9:
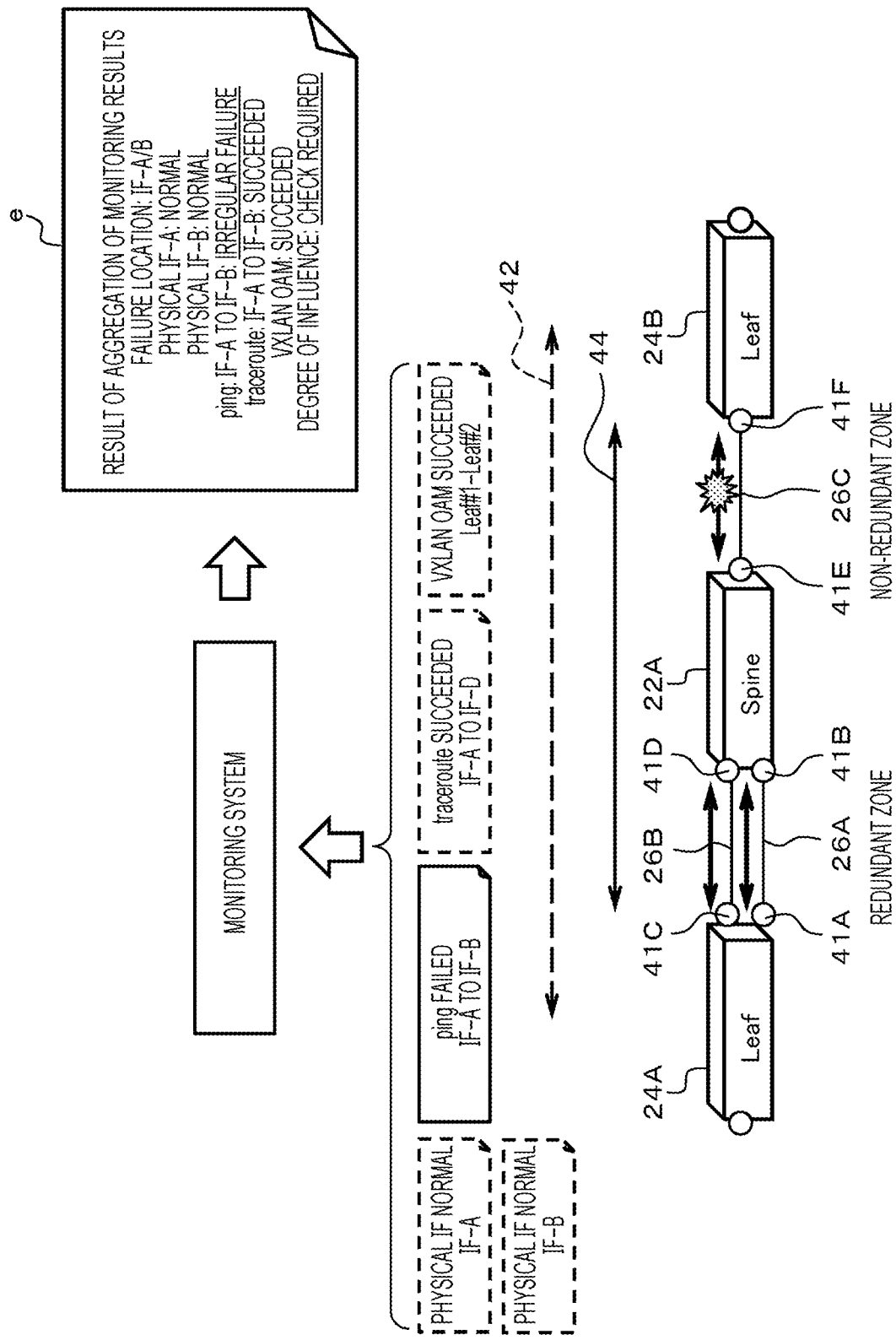
FIG. 9 is a diagram for explaining a third example failure state.

FIG. 9 is a diagram for explaining a third example failure state.

The third example failure state indicates a case where the physical interfaces 41 are normal but the ping fails in the non-redundant zone.

The connection configuration illustrated in FIG. 9 is the same as that in FIG. 7.

Here, as for the physical interfaces 41E and 41F in the non-redundant zone, any failure is not detected in the physical interfaces 41E and 41F, but the ping in the link 26C connecting the physical interfaces 41E and 41F fails.

In such a case, the results of aggregation of the monitoring results are as follows (see reference sign e in FIG. 9).

The failure locations are aggregated in the physical interfaces 41E and 41F. As for the failure type, since the ping has failed though the physical interfaces 41E and 41F are normal, it is determined that an irregular failure that hinders normal communication has occurred.

The degree of influence of the failure is determined to be in need of checking, because of the irregular failure in the non-redundant zone.

<Details of Failure Determination>

Failure determination based on the results of monitoring of the respective monitoring targets is described in greater detail.

In a case where a communication failure event has occurred in the second to fourth monitoring targets excluding the physical interfaces 41 as the first monitoring target, the failure determination unit 304 refers to the results of monitoring of other monitoring targets to identify the location of the cause of the failure, and then finally determines the event to be identified as the failure cause.

Figure 10:
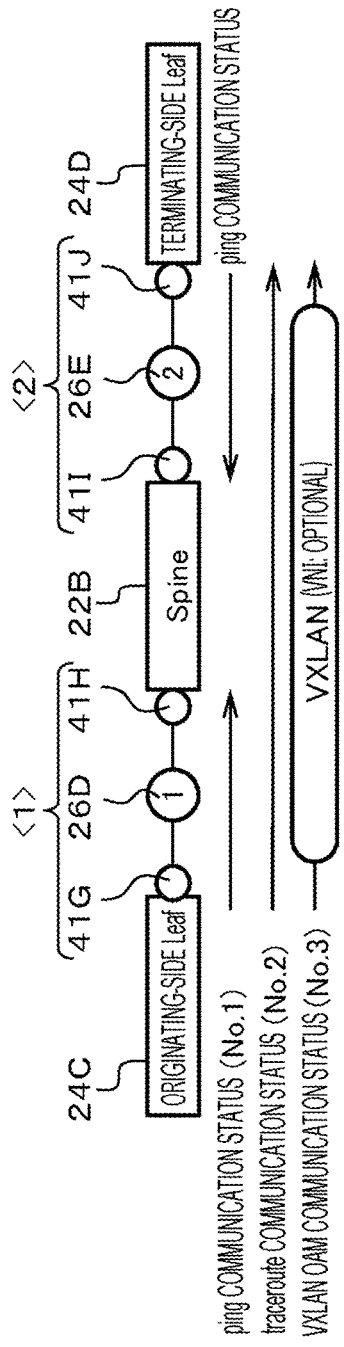
FIG. 10 is a table showing the reference relationship between the results of monitoring of the respective monitoring targets.

FIG. 10 is a table showing the reference relationship between the results of monitoring in the respective monitoring targets.

A leaf node 24C is set as the originating-side leaf node, and a leaf node 24D is set as the terminating-side leaf node, and these leaf nodes 24C and 24D are connected via a spine node 22B. A physical interface 41G of the originating-side leaf node 24C and a physical interface 41H of the spine node 22B are set as a first physical interface pair, and the link connecting the first physical interface pair is set as a first link 26D. Meanwhile, a physical interface 41J of the terminating-side leaf node 24D and a physical interface 41I of the spine node 22B are set as a second physical interface pair, and the link connecting the second physical interface pair is set as a second link 26E.

The table in FIG. 10 shows, from left, occurring events (event types, event statuses, and detection locations), and reference destination events (physical interface pair status=the results of monitoring of the first monitoring target, ping communication status=the results of monitoring of the second monitoring target, and traceroute communication status=the results of monitoring of the third monitoring target).

No. 1 in FIG. 10 indicates a case where a failure in ping communication has occurred in the first link 26D, which is a case where a failure is detected in the link 26 as the second monitoring target.

In this case, the failure determination unit 304 refers to the status of the first physical interface pair, to determine the event that has caused the failure.

More specifically, since the ping is executed for each physical interface pair, the failure determination unit 304 identifies the cause of the failure, by referring to only the status of the physical interface pair (first physical interface pair) on the side of the originating-side leaf node 24C in which the ping communication failure has occurred.

No. 2 in FIG. 10 indicates a case where a traceroute communication failure has occurred between the originating-side leaf node 24C and the terminating-side leaf node 24D, which is a case where a failure is detected in the transfer function unit 23 of the spine node 22 as the third monitoring target.

In this case, the failure determination unit 304 determines the event that has caused the failure, by referring to the status of the first physical interface pair, the status of the second physical interface pair, the ping communication status in the first link 26D, and the ping communication status in the second link 26E.

More specifically, since the traceroute passes through the two physical interface pairs between the originating-side leaf node 24C and the spine node 22B and between the spine node 22B and the terminating-side leaf node 24D, the failure determination unit 304 identifies the cause of the failure by referring to the status of each physical interface pair and the ping communication status in the link 26 between each physical interface pair.

No. 3 in FIG. 10 indicates a case where a VXLAN OAM communication failure has occurred between the originating-side leaf node 24C and the terminating-side leaf node 24D, which is a case where a failure is detected in the overlay tunnel 42 as the fourth monitoring target. Note that setting of VNI between the originating-side leaf node 24C and the terminating-side leaf node 24D is optional.

In this case, the failure determination unit 304 determines the event that has caused the failure, by referring to the status of the second physical interface pair, the ping communication status in the second link 26E, and the traceroute communication status between the originating-side leaf node 24C and the terminating-side leaf node 24D (the same path as VXLAN OAM).

More specifically, like the traceroute, VXLAN OAM passes between the originating-side leaf node 24C and the spine node 22B, and between the spine node 22B and the terminating-side leaf node 24D, but, with a VXLAN OAM command, transmitted data might not arrive at the spine node 22B in some cases. In a case where data does not arrive at the spine node 22B, the spine node 22 through which the data is to pass cannot be identified, and therefore, such a case is an event not to be aggregated. In a case where data arrives at the spine node 22B, the communication between the originating-side leaf node 24C and the spine node 22B is considered normal. In view of this, the failure determination unit 304 identifies the cause of the failure by referring to the status between the remaining spine node 22B and the terminating-side leaf node 24D (the status of the second physical interface pair and the ping communication status in the second link 26E), and the traceroute communication status between the originating-side leaf node 24C and the terminating-side leaf node 24D.

That is, in a case where a failure is detected in a link 26 (the second monitoring target), the failure determination unit 304 determines the failure type by referring to the results of monitoring of the pair of physical interfaces connected to both ends of the link 26. In a case where a failure is detected in the transfer function unit 23 (the third monitoring target) of a spine node 22, the failure determination unit 304 determines the failure type by referring to the results of monitoring of each link 26 between the spine node 22 and the two leaf nodes 24 connected to the spine node 22, and the results of monitoring of the pair of physical interfaces 41 connected to both ends of each link 26. In a case where a failure is detected in an overlay tunnel 42 (the fourth monitoring target), the failure determination unit 304 determines the failure type by referring to the results of monitoring of the transfer function unit 23 of the spine node 22 connecting the leaf node 24 on the originating side and the leaf node 24 on the terminating side, the results of monitoring of the link 26 between the leaf node 24 on the terminating side and the spine node 22, and the results of monitoring of the pair of physical interfaces 41 connected to both ends of the link 26.

Nos. 1 to 3 in FIG. 10 are now described in greater detail.

FIG. 11 is a table illustrating a method for determining the failure cause event when ping communication has failed.

The table in FIG. 11 shows, from left, reference destination events (statuses of the first physical interface pair), occurring events (events detected at the time of aggregation and the events (event names) determined to be failure causes), and failure types.

As described above, in a case where a ping communication failure has occurred (the case of No. 1 in FIG. 10), the failure determination unit 304 refers to the status of the first physical interface pair, to determine the event that has caused the failure.

As in No. 1 in FIG. 11, in a case where the statues of the two physical interfaces (the physical interface 41G and the physical interface 41H) constituting the first physical interface pair are all "up" (normal), but the ping communication fails, it is considered that a silent failure has occurred, because the ping communication fails though any physical failure has not been detected in both of the two physical interfaces constituting the first physical interface pair.

Therefore, the failure determination unit 304 determines that the ping communication failure due to the silent failure is the failure cause event, and determines the failure type to be "irregular failure".

As in No. 2 in FIG. 11, in a case where the states of the two physical interfaces constituting the first physical interface pair are all "down" (failure occurred), it is considered that the ping communication has failed because a physical failure has occurred between the first physical interface pair.

Therefore, the failure determination unit 304 determines that the ping communication failure due to the failure in the physical interfaces 41 is the failure cause event, and determines the failure type to be "other-factor failure".

Note that this state corresponds to the first example failure state described above with reference to FIG. 7.

As in No. 3 in FIG. 11, in a case where a failure has occurred in one of the two physical interfaces constituting the first physical interface pair, and the other physical interface is normal, or a case where there is a difference in monitoring results between the physical interfaces forming a pair (this difference will be hereinafter referred to as the "IF difference"), it is considered that the ping communication has failed because a physical failure has occurred between the first physical interface pair.

Therefore, the failure determination unit 304 determines that the ping communication failure due to the failure in the physical interfaces 41 is the failure cause event, and determines the failure type to be "other-factor failure".

As in No. 4 in FIG. 11, in a case where the status of the first physical interface pair is "unknown", information about the status of the first physical interface pair cannot be obtained, and therefore, the cause of the ping communication failure is "unknown".

Accordingly, the failure determination unit 304 determines the ping communication failure to be the failure cause event, and determines the failure type to be "unidentifiable".

As in No. 5 in FIG. 11, in a case where monitoring of the first physical interface pair is "off", information about the status of the first physical interface pair cannot be obtained, and therefore, the cause of the ping communication failure is "unknown".

Accordingly, the failure determination unit 304 determines the ping communication failure to be the failure cause event, and determines the failure type to be "unidentifiable".

FIG. 12 is a table illustrating a method for determining the failure cause event when traceroute communication has failed.

The table in FIG. 12 shows, from left, reference destination events (statuses of the first physical interface pair, ping communication statuses in the link 26D between the first physical interface pair, statuses of the second physical interface pair, and ping communication statuses in the link 26E between the second physical interface pair), occurring events (events detected at the time of aggregation, and events (event names) determined to be failure causes), and failure types.

Note that "ANY" in the tables described hereinafter indicates that the corresponding item may have any status.

As described above, in a case where a traceroute communication failure has occurred (in the case of No. 2 in FIG. 10), the failure determination unit 304 determines the event that has caused the failure, by referring to the statuses of the first physical interface pair and the second physical interface pair, and the ping communication statuses in the first link 26D and the second link 26E.

As in No. 1 in FIG. 12, in a case where the statuses of the first physical interface pair and the second physical interface pair are both "up" (normal), and the ping communications in both the first link 26D and the second link 26E is successful, but the traceroute communication has failed, the transfer function unit 23 of the spine node 22 is considered the cause of the traceroute communication failure, because there is not a problem in the statuses and the ping communication of the physical interface pairs on both the originating side and the terminating side.

Therefore, the failure determination unit 304 determines that the failure in the traceroute communication due to the failure (a transit abnormality) in the transfer function unit 23 of the spine node 22 is the failure cause event, and determines the failure type to be "irregular failure".

As in No. 2 in FIG. 12, in a case where the statuses of the first physical interface pair and the second physical interface pair are both "up" (normal), and the ping communication in the first link 26D is successful, but the ping communication in the second link 26E has failed, a silent failure that has occurred in the second physical interface pair on the terminating side is considered the cause of the traceroute communication failure.

Therefore, the failure determination unit 304 determines that the traceroute communication failure due to the silent failure is the failure cause event, and determines the failure type to be "other-factor failure".

As in No. 3 in FIG. 12, in a case where the status of the first physical interface pair is "up" (normal), and the ping communication in the first link 26D is successful, but the status of the second physical interface pair is "down" (failure occurred) or there is an IF difference between the second physical interface pair, a physical failure in the second physical interface pair on the terminating side is considered the cause of the traceroute communication failure.

Therefore, the failure determination unit 304 determines that the traceroute communication failure due to the failure in the physical interfaces is the failure cause event, and determines the failure type to be "other-factor failure".

As in No. 4 in FIG. 12, in a case where the status of the first physical interface pair is "up" (normal), and the ping communication in the first link 26D is successful, but the status of the second physical interface pair is "unknown", any information about the status of the second physical interface pair cannot be obtained, and therefore, the cause of the traceroute communication failure is "unknown".

Accordingly, the failure determination unit 304 determines the traceroute communication failure to be the failure cause event, and determines the failure type to be "unidentifiable".

As in No. 5 in FIG. 12, in a case where the statuses of the first physical interface pair and the second physical interface pair are both "up" (normal), and the ping communication in the first link 26D is successful, but the ping communication status in the second link 26E is "unknown", any information about the ping communication status in the second link 26E cannot be obtained, and therefore, the cause of the traceroute communication failure is "unknown".

Accordingly, the failure determination unit 304 determines the traceroute communication failure to be the failure cause event, and determines the failure type to be "unidentifiable".

As in No. 6 in FIG. 12, in a case where the status of the first physical interface pair is "up" (normal), but the ping communication in the first link 26D1 has failed, a silent failure in the first physical interface pair on the originating side is considered the cause of the traceroute communication failure.

Therefore, the failure determination unit 304 determines that the traceroute communication failure due to the silent failure is the failure cause event, and determines the failure type to be "other-factor failure".

As in No. 7 in FIG. 12, in a case where the status of the first physical interface pair is "down" (failure occurred) or there is an IF difference between the first physical interface pair, and the ping communication in the first link 26D has failed, a physical failure in the first physical interface pair on the originating side is considered the cause of the traceroute communication failure.

Therefore, the failure determination unit 304 determines that the traceroute communication failure due to the failure in the physical interfaces is the failure cause event, and determines the failure type to be "other-factor failure".

As in No. 8 in FIG. 12, in a case where the status of the first physical interface pair is "up" (normal), but the ping communication status in the first link 26D is "unknown", any information about the ping communication status in the first link 26D cannot be obtained, and therefore, the cause of the traceroute communication failure is "unknown".

Accordingly, the failure determination unit 304 determines the traceroute communication failure to be the failure cause event, and determines the failure type to be "unidentifiable".

As in No. 9 in FIG. 12, in a case where the status of the first physical interface pair is "unknown", information about the status of the physical interface pair cannot be obtained, and therefore, the cause of the traceroute communication failure is "unknown".

Accordingly, the failure determination unit 304 determines the traceroute communication failure to be the failure cause event, and determines the failure type to be "unidentifiable".

As in No. 10 in FIG. 12, in a case where monitoring of the ping communication statuses in the first physical interface pair and the second physical interface pair is "off", information about the ping communication statuses cannot be obtained, and therefore, the cause of the traceroute communication failure is "unknown".

Accordingly, the failure determination unit 304 determines the traceroute communication failure to be the failure cause event, and determines the failure type to be "unidentifiable".

As in No. 11 in FIG. 12, in a case where monitoring of the status of the first physical interface pair and the status of the second physical interface pair is "off", information about the statuses of the physical interface pairs cannot be obtained, and therefore, the cause of the traceroute communication failure is "unknown".

Accordingly, the failure determination unit 304 determines the traceroute communication failure to be the failure cause event, and determines the failure type to be "unidentifiable".

FIG. 13 is a table illustrating a method for determining the failure cause event when VXLAN OAM communication has failed.

The table in FIG. 13 shows, from left, reference destination events (statuses of the second physical interface pair on the terminating side, ping communication statuses in the second link 26E, and traceroute communication statuses), occurring events (events detected at the time of aggregation and the events (event names) determined to be failure causes), and failure types.

Note that, in the drawings described hereinafter, "skipped" in the table indicates a state in which monitoring is not performed. For example, in a case where physical interfaces 41 are in a "down" state, it may not be possible to execute a ping or a traceroute for the physical interfaces 41, and a state in which monitoring is not performed in such a case is defined as "skipped".

As described above, in a case where a VXLAN OAM communication failure has occurred (the case of No. 3 in FIG. 10), the failure determination unit 304 determines the event that has caused the failure, by referring to the status of the second physical interface pair, the ping communication status in the second link 26E, and the traceroute communication status between the originating-side leaf node 24C and the terminating-side leaf node 24D.

As in No. 1 in FIG. 13, in a case where the status of the second physical interface pair is "up" (normal), the ping communication in the second link 26E is "successful" or "skipped", and the traceroute communication is also successful, but the VXLAN OAM communication has failed, any problem has not occurred in the underlays from the originating-side leaf node 24C to the terminating-side leaf node 24D. Therefore, an unconfigured overlay (VXLAN) is considered the cause of the VXLAN communication failure.

Accordingly, the failure determination unit 304 determines that the VXLAN communication failure (failed) due to unconfigured VXLAN in the destination leaf node is the failure cause event, and determines the failure type to be "irregular failure".

As in No. 2 in FIG. 13, in a case where the status of the second physical interface pair is "up" (normal), the ping communication in the second link 26E is "successful" or "skipped", and the traceroute communication has failed, there is not a problem in both the originating-side and terminating-side physical interface pairs, and the ping communication. Therefore, the transfer function unit 23 (transit) of the spine node 22 is considered the cause of the VXLAN communication failure.

Accordingly, the failure determination unit 304 determines that the VXLAN communication failure (failed) due to the transit abnormality in the spine node 22B is the failure cause event, and determines the failure type to be "other-factor failure".

As in No. 3 in FIG. 13, in a case where the status of the second physical interface pair is "up" (normal), the ping communication in the second link 26E is "successful" or "skipped", and the traceroute communication status is "unknown", any information about the traceroute communication status cannot be obtained, and therefore, the cause of the VXLAN communication failure is "unknown".

Accordingly, the failure determination unit 304 determines the VXLAN communication failure (failed) to be the failure cause event, and determines the failure type to be "unidentifiable".

As in No. 4 in FIG. 13, in a case where the status of the second physical interface pair is "up" (normal), but the ping communication in the second link 26E has failed, a silent failure in the second physical interface pair on the terminating side is considered the cause of the VXLAN communication failure.

Therefore, the failure determination unit 304 determines that the VXLAN communication failure (failed) due to the silent failure is the failure cause event, and determines the failure type to be "other-factor failure".

As in No. 5 in FIG. 13, in a case where the status of the second physical interface pair is "down" (failure) or there is an IF difference between the second physical interface pair, a physical failure in the second physical interface pair on the terminating side is considered the cause of the VXLAN communication failure.

Therefore, the failure determination unit 304 determines that the VXLAN communication failure (failed) due to the failure in the physical interfaces 41 is the failure cause event, and determines the failure type to be "other-factor failure".

As in No. 6 in FIG. 13, in a case where the status of the second physical interface pair is "up" (normal), but the ping communication status in the second link 26E is "unknown", any information about the ping communication status in the second link 26E cannot be obtained, and therefore, the cause of the VXLAN communication failure is "unknown".

Accordingly, the failure determination unit 304 determines the VXLAN communication failure (failed) to be the failure cause event, and determines the failure type to be "unidentifiable".

As in No. 7 in FIG. 13, in a case where the status of the second physical interface pair is "unknown", the status of the physical interface pair cannot be obtained, and therefore, the cause of the VXLAN communication failure is "unknown".

Accordingly, the failure determination unit 304 determines the VXLAN communication failure (failed) to be the failure cause event, and determines the failure type to be "unidentifiable".

As in No. 8 in FIG. 13, in a case where monitoring of the traceroute communication status between the originating-side leaf node 24C and the terminating-side leaf node 24D is "off", information about the traceroute communication status cannot be obtained, and therefore, the cause of the VXLAN communication failure is "unknown".

In this case, the failure determination unit 304 determines the VXLAN communication failure (failed) to be the failure cause event, and determines the failure type to be "unidentifiable".

As in No. 9 in FIG. 13, in a case where monitoring of the ping communication status in the second link 26E is "off", any information about the ping communication status in the second link 26E cannot be obtained, and therefore, the cause of the VXLAN communication failure is "unknown".

In this case, the failure determination unit 304 determines the VXLAN communication failure (failed) to be the failure cause event, and determines the failure type to be "unidentifiable".

As in No. 10 in FIG. 13, in a case where monitoring of the status of the second physical interface pair is "off", information about the status of the second physical interface pair cannot be obtained, and therefore, the cause of the VXLAN communication failure is "unknown".

In this case, the failure determination unit 304 determines the VXLAN communication failure (failed) to be the failure cause event, and determines the failure type to be "unidentifiable".

<Measures to be Taken When There is Inconsistency in Monitoring Results>

Next, a case where there is an inconsistency in monitoring results in each monitoring target is described.

As for the results of monitoring of the first to fourth monitoring targets in the same communication path, in a case where an abnormality has occurred in a lower layer (the first monitoring target, the second monitoring target, the third monitoring target, and the fourth monitoring target in ascending order from the lowest layer), the result of monitoring of an upper layer will also be basically "failed". However, depending on a difference in timing to start or complete a monitoring process, there might be a case where the result of monitoring an upper layer is successful though the result of monitoring of a lower layer indicates a failure.

FIG. 14 is a table showing example states in which there is an inconsistency in monitoring results.

The table in FIG. 14 shows, from left, statuses of the first physical interface pair, ping communication statuses in the first link 26D, statuses of the second physical interface pair, ping communication statuses in the second link 26E, traceroute communication statuses, and VXLAN OAM communication statuses, as the events detected during monitoring.

Nos. 1 to 3 in FIG. 14 indicate cases where the status of the first physical interface pair is "down" (failure) or an IF difference state, but at least one communication among the ping communication (No. 1), the traceroute communication (No. 2), and the VXLAN OAM communication (No. 3) in the first link 26D has succeeded.

That is, the first physical interface pair on the originating side is "down", but the upper layer monitoring result (ping/traceroute/VXLAN OAM) is successful in this case.

Nos. 4 to 6 in FIG. 14 indicate cases where the status of the second physical interface pair is "down" (failure) or an IF difference state, but at least one communication among the ping communication (No. 4), the traceroute communication (No. 5), and the VXLAN OAM communication (No. 6) in the second link 26E has succeeded.

That is, the second physical interface pair on the terminating side is "down", but the upper layer monitoring result (ping/traceroute/VXLAN OAM) is successful in this case.

Nos. 7 and 8 in FIG. 14 indicate cases where, while the status of the first physical interface pair is "up" (normal), the ping communication in the first link 26D has failed, and the traceroute communication (No. 7) and/or the VXLAN OAM communication (No. 8) has succeeded.

That is, the ping communication in the first physical interface pair on the originating side has failed, but the upper layer monitoring result (traceroute/VXLAN OAM) is successful in this case.

Nos. 9 and 10 in FIG. 14 indicate cases where, while the status of the second physical interface pair is "up" (normal), the ping communication in the second link 26E has failed, and the traceroute communication (No. 9) and/or the VXLAN OAM communication (No. 10) has succeeded.

That is, the ping communication in the second physical interface pair on the terminating side has failed, but the upper layer monitoring result (traceroute/VXLAN OAM) is successful in this case.

No. 11 in FIG. 14 indicates a case where the traceroute communication has failed, but the VXLAN OAM communication has succeeded.

That is, the traceroute communication in the same path has failed, but the upper layer monitoring result (VXLAN OAM) is successful in this case.

No. 12 in FIG. 14 indicates a case where the status of the first physical interface pair is "up" (normal), but the ping communication check in the first link 26D is skipped.

No. 13 in FIG. 14 indicates a case where the status of the second physical interface pair is "up" (normal), but the ping communication check in the second link 26E is skipped.

No. 14 in FIG. 14 indicates a case where the status of the first physical interface pair is "up" (normal), but the traceroute communication check is skipped.

That is, Nos. 12 to 14 in FIG. 14 are cases where the upper layer monitoring process (ping/traceroute) is skipped, even though the physical interface state is "up" (normal).

In a case where there is an inconsistency in the monitoring results as shown in FIG. 14, the failure determination unit 304 determines the failure cause event from the results of aggregation over a plurality of aggregation cycles as illustrated in FIG. 15.

FIG. 15 is a diagram illustrating a failure determination method based on a plurality of aggregation results.

The meaning of each symbol in FIG. 15 is the same as that shown in the legends in FIG. 4. For ease of explanation, the third monitoring target and the fourth monitoring target are not illustrated in FIG. 15.

Since monitoring of the first to fourth monitoring targets is performed in each monitoring cycle set for the respective monitoring targets, there is a time lag between failure occurrence and failure detection. For example, in a case where a monitoring target is monitored in a one-minute cycle, when a failure occurs immediately after the monitoring, it takes about one minute at the maximum before the failure is detected.

Further, since the monitoring result aggregation is performed using the monitoring results immediately before the aggregation timing, there is a possibility that accurate determination cannot be performed after one monitoring interval.

That is, when monitoring results reported while failure detection has not been performed in each monitoring target are aggregated, there is a possibility that an irregular failure is erroneously determined.

Therefore, the failure determination unit 304 does not perform failure determination only from one aggregation result, but performs failure determination using the aggregation results over a plurality of cycles. In this manner, it is possible to prevent erroneous determination due to a difference between the monitoring cycles and the aggregation cycles.

Further, in a case where a failure has been detected once but does not last and is recovered in the next cycle, the failure is determined to be an intermittent failure, and the result to be reported indicates no failures. Note that the number of failure detection cycles within which a failure is determined to be an intermittent failure is set separately.

For example, in the example illustrated in FIG. 15, a monitoring result collection cycle is one minute, and the aggregation timing is at the 00th second in each minute. A monitoring cycle for the physical interfaces 41 as the first monitoring target is 20 minutes, and the monitoring timing is at the 10th second, 30th second, and the 50th second in each minute. A monitoring cycle for the leaf-spine links 26 as the second monitoring target is one minute, and the monitoring timing is at the 30th second in each minute. During the first aggregation cycle (one minute and 00 seconds), three monitoring results are obtained with respect to the first monitoring target, and one monitoring result is obtained with respect to the second monitoring target.

Here, the example case described herein is a case where a failure has occurred in the first monitoring target immediately after the second monitoring of the first monitoring target and the first monitoring of the second monitoring target are performed (after 0 minutes and 30 seconds). In this case, a failure due to a failure in the lower first monitoring target also occurs in the second monitoring target.

As for the first monitoring target, monitoring is further performed once before the aggregation timing, and the failure occurrences can be reflected in the monitoring results. As for the second monitoring target, on the other hand, no more monitoring is performed before the aggregation timing, and therefore, any failure occurrence cannot be reflected in any monitoring result.

In this case, the failure determination unit 304 obtains monitoring results indicating that the first monitoring target has a failure and the second monitoring target is normal, and determines that an irregular failure has occurred from the aggregation result at this timing (the first aggregation cycle) (see reference sign f in FIG. 15).

In the second aggregation cycle, on the other hand, the monitoring result of the first monitoring target still indicates a failure, and a failure occurrence in the second monitoring target can also be reflected in the monitoring result.

In this case, the failure determination unit 304 obtains monitoring results indicating that both the first monitoring target and the second monitoring target have a failure, and determines that a regular failure has occurred (see reference sign g in FIG. 15).

As described above, as the failure determination unit 304 determines the failure type and the degree of influence of the failure on the basis of the results of aggregation of the results of monitoring performed a plurality of times, it is possible to perform failure determination while the monitoring results are stable, and enhance the accuracy of the failure determination.

<Flowchart>

Figure 16:
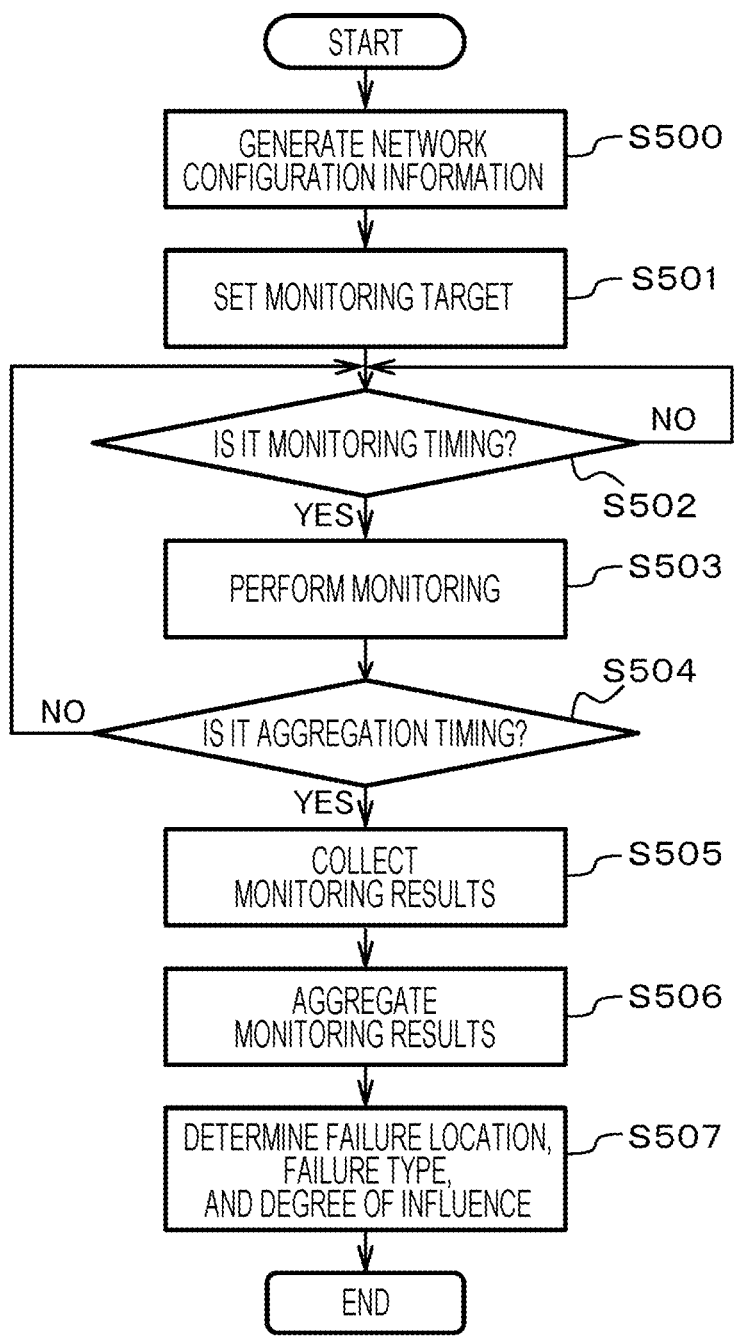
FIG. 16 is a flowchart showing the procedures in a network monitoring process to be performed by the network monitoring apparatus.

FIG. 16 is a flowchart showing the procedures in a network monitoring process to be performed by the network monitoring apparatus 30.

First, the network monitoring apparatus 30 generates network configuration information about the communication network 20 with the network configuration management unit 300 (step S500). The generated network configuration information is recorded into the storage unit 301.

Next, the network monitoring apparatus 30 sets monitoring targets (the first to fourth monitoring targets) in the communication network 20 with the monitoring target setting unit 302 (step S501). At this point of time, the monitoring target setting unit 302 also sets the monitoring cycles and the monitoring timing for each monitoring target.

A check is then made to determine whether it is the monitoring timing set for each monitoring target (step S502). When the monitoring timing comes (step S502: Yes), monitoring of the monitoring target is performed in each device on the basis of a monitoring execution instruction from the monitoring execution unit 303 (step S503). On the other hand, if it is not yet the monitoring timing (step S502: No), the process waits until the monitoring timing.

Next, a check is made to determine whether it is the monitoring result aggregation timing (step S504). Until the aggregation timing comes (step S504: No in the loop), the process returns to step S502, and monitoring of each monitoring target is continued. When the monitoring result aggregation timing comes (step S504: Yes), the monitoring execution unit 303 collects the results of monitoring of the respective monitoring targets (step S505). The failure determination unit 304 aggregates the monitoring results (step S506), determines the location of occurrence of the failure, the failure type, and the degree of influence of the failure (step S507), and ends the process according to this flowchart.

<Hardware Configuration>

Figure 17:
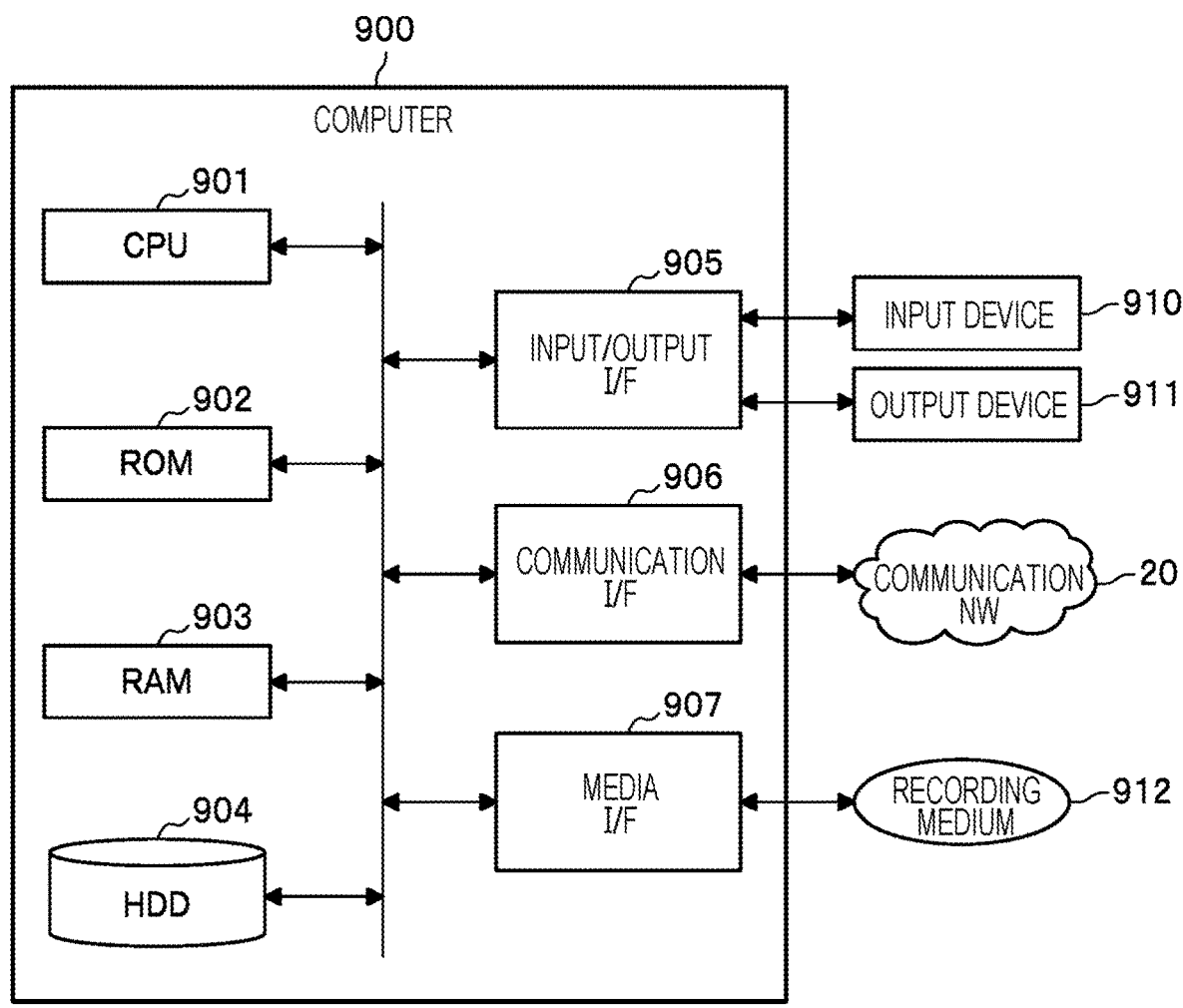
FIG. 17 is a hardware configuration diagram illustrating an example of a computer that implements the functions of the network monitoring apparatus according to the present embodiment.

The network monitoring apparatus 30 according to the present embodiment is formed with a computer 900 that has the configuration illustrated in FIG. 17, for example, and is made to function as the network monitoring apparatus 30.

FIG. 17 is a hardware configuration diagram illustrating an example of a computer 900 that implements the functions of the network monitoring apparatus 30 according to the present embodiment. The computer 900 includes a central processing unit (CPU) 901, a read only memory (ROM) 902, a RAM 903, a hard disk drive (HDD) 904, an input/output interface (I/F) 905, a communication I/F 906, and a media I/F 907.

The CPU 901 operates on the basis of a program stored in the ROM 902 or the HDD 904, and performs processes corresponding to the respective functional components illustrated in FIG. 2. The ROM 902 stores a boot program to be executed by the CPU 901 at the time of starting the computer 900, a program related to the hardware of the computer 900, and the like.

The CPU 901 controls, via the input/output I/F 905, an input device 910 such as a mouse or a keyboard, and an output device 911 such as a display or a printer. The CPU 901 acquires data from the input device 910 and outputs generated data to the output device 911, via the input/output I/F 905. Note that a graphics processing unit (GPU) or the like may be used as a processor in conjunction with the CPU 901.

The HDD 904 stores a program to be executed by the CPU 901, the data to be used by the program, and the like. The communication I/F 906 receives data from another device via a communication network (the communication network (NW)) 20, for example) and outputs the data to the CPU 901, or transmits data created by the CPU 901 to another device via the communication network.

The media I/F 907 reads a program or data stored in a recording medium 912, and outputs the program or data to the CPU 901 via the RAM 903. The CPU 901 loads a program related to the target processing from the recording medium 912 into the RAM 903 via the media I/F 907, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a semiconductor memory, or the like.

For example, when the computer 900 functions as the network monitoring apparatus 30 according to the present invention, the CPU 901 of the computer 900 achieves the functions of the network monitoring apparatus 30 by executing the program loaded into the RAM 903. The HDD 904 stores the data in the RAM 903. The CPU 901 reads the program related to the target processing from the recording medium 912, and executes the program. Alternatively, the CPU 901 may read a program related to the target processing from another device via the communication network (NW 920).

<Effects>

The following is a description of the effects of the network monitoring apparatus according to the present invention.

The network monitoring apparatus 30 according to the present invention is the network monitoring apparatus 30 that monitors the communication network 20 including a plurality of leaf nodes 24, a plurality of spine nodes 22, and the links 26 connecting the leaf nodes 24 and the spine nodes 22. The network monitoring apparatus 30 characteristically includes: the network configuration management unit 300 that generates the network configuration information about the communication network 20; the monitoring target setting unit 302 that sets a plurality of types of monitoring targets in the communication network 20, on the basis of the network configuration information; the monitoring execution unit 303 that issues a monitoring execution instruction with respect to each of the monitoring targets, and collects monitoring results; and the failure determination unit 304 that aggregates the results of monitoring of the respective monitoring targets, and determines the failure type of a failure and the degree of influence of the failure on communication, on the basis of the type of the monitoring target in which the failure has occurred and the occurring event. The monitoring target setting unit 302 characteristically sets the monitoring targets, which are the physical interfaces 41 included in the leaf nodes 24 and the spine nodes 22, the links 26 connecting the leaf nodes 24 and the spine nodes, the transfer function units 23 included in the spine nodes 22, and the overlay tunnel 42 set between the originating-side leaf node 24 and the terminating-side leaf node 24.

As described above, the network monitoring apparatus 30 according to the present invention performs failure determination by combining monitoring results in a plurality of devices and a plurality of layers, using the network configuration information.

In this configuration, normality monitoring and influence determination at a time of a failure can be performed like a chassis-type device, even in a fabric network that includes leaf nodes 24 and the spine node 22.

Also, in a case where a failure is detected in a link 26 in the network monitoring apparatus 30 according to the present invention, the failure determination unit 304 characteristically determines the failure type by referring to the results of monitoring of a pair of physical interfaces 41 connected to both ends of the link 26. In a case where a failure is detected in the transfer function unit 23 of a spine node 22, the failure determination unit 304 determines the failure type by referring to the results of monitoring of each link 26 between the spine node 22 and the two leaf nodes 24 connected to the spine node 22, and the results of monitoring of the pair of physical interfaces 41 connected to both ends of each link 26. In a case where a failure is detected in an overlay tunnel 42, the failure determination unit 304 determines the failure type by referring to the results of monitoring of the transfer function unit 23 of the spine node 22 connecting the originating-side leaf node 24 and the terminating-side leaf node 24, the results of monitoring of the link 26 between the terminating-side leaf node 24 and the spine node 22, and the results of monitoring of the pair of physical interfaces 41 connected to both ends of the link 26.

With this arrangement, it is possible to perform failure determination by combining monitoring information in a plurality of layers, and detect an abnormal state such as a silent failure that cannot be detected by monitoring with a single device.

Further, in the network monitoring apparatus 30 according to the present invention, the failure determination unit 304 characteristically classifies failure types into: a regular failure in which detection of a failure in the device forming a leaf node 24 or a spine node 22, and switching of communication paths can be properly performed; an irregular failure in which detection of a failure in the device forming a leaf node 24 or a spine node 22 cannot be properly performed; and an other-factor failure that is a failure caused by a failure in another monitoring target, and classifies degrees of influence of failures into: a low-influence state in which a failure has occurred in a zone having redundancy, and communications are not affected; a high-influence state in which a failure has occurred in a zone having no redundancy or redundancy is lost due to a failure, and communications are affected; and a check-required state in which there is a possibility that an irregular failure occurs and affects communications.

With this arrangement, it is possible to quickly determine whether immediate measures need to be taken when a failure occurs. Thus, it is possible to minimize the influence on the communication service using the communication network 20, and reduce the operation required for maintenance.

Also, in the network monitoring apparatus 30 according to the present invention, the monitoring execution unit 303 characteristically issues a monitoring execution instruction in each predetermined monitoring cycle, the failure determination unit 304 characteristically aggregates monitoring results in each predetermined aggregation cycle, and the monitoring result aggregation cycles are set to be equal to or longer than the monitoring cycles.

With this arrangement, the monitoring results can be aggregated at the timing when the monitoring results of all the monitoring targets are updated. Thus, the status of each monitoring target can be more accurately grasped, and the accuracy of failure determination can be enhanced.

Further, in the network monitoring apparatus 30 according to the present invention, the failure determination unit 304 characteristically determines the failure type and the degree of influence of the failure, on the basis of the results of monitoring result aggregation performed a plurality of times.

With this arrangement, it is possible to prevent erroneous determination of the status of the communication network 20 due to a time lag between execution of monitoring and a failure occurrence, and enhance the accuracy of failure determination.

REFERENCE SIGNS LIST 20 communication network
22 (22A to 22B) spine node
23 transfer function unit
24 (22A to 22D) leaf node
26 (26A to 26E) link
30 network monitoring apparatus
300 network configuration management unit
301 storage unit
302 monitoring target setting unit
303 monitoring execution unit
304 failure determination unit
41 (41A to 41J) physical interface
42 overlay tunnel

The invention claimed is:

1. A network monitoring apparatus configured to monitor a communication network including a plurality of leaf nodes, a plurality of spine nodes, and links connecting the leaf nodes and the spine nodes, the network monitoring apparatus comprising a processor configured to perform operations comprising:
generating network configuration information about the communication network;
setting a plurality of types of monitoring targets in the communication network, on a basis of the network configuration information;
issuing a monitoring execution instruction with respect to each of the monitoring targets, and collecting monitoring results; and
aggregating the monitoring results from respective monitoring targets, and determining a failure type of a failure and a degree of influence of the failure, on a basis of a type of the monitoring target having the failure and an occurring event,
wherein setting the plurality of the monitoring targets comprises setting physical interfaces included in the leaf nodes and the spine nodes, the links connecting the leaf nodes and the spine nodes, transfer function units included in the spine nodes, and an overlay tunnel set between an originating-side leaf node and a terminating-side leaf node,
wherein aggregating the monitoring results comprises aggregating the monitoring results from the same physical location into a single notification in each aggregation cycle, and
wherein determining the failure type and the degree of influence of the failure comprises determining the failure type and the degree of influence of the failure using aggregation results over a plurality of aggregation cycles.

2. The network monitoring apparatus according to claim 1, wherein,
when a failure is detected in a link, the processor is configured to determine the failure type by referring to results of monitoring of a pair of the physical interfaces connected to both ends of the link,
when a failure is detected in the transfer function unit of the spine node, the processor is configured to determine the failure type by referring to results of monitoring of the respective links between the spine node and two leaf nodes connected to the spine node, and results of monitoring of pairs of the physical interfaces connected to both ends of the respective links, and,
when a failure is detected in the overlay tunnel, the processor is configured to determine the failure type by referring to a result of monitoring of the transfer function unit of the spine node connecting the originating-side leaf node and the terminating-side leaf node, a result of monitoring of the link between the terminating-side leaf node and the spine node, and results of monitoring of the pair of physical interfaces connected to both ends of the link.

3. The network monitoring apparatus according to claim 1, wherein the processor is configured to perform operations comprising:
classifying the failure types into: a regular failure in which detection of a failure in a device forming the leaf node or the spine node and switching of communication paths can be properly performed; an irregular failure in which detection of a failure in the device forming the leaf node or the spine node cannot be properly performed; and an other-factor failure that is caused by a failure in another monitoring target, and
classifying the degrees of influence of failures into: a low-influence state in which a failure has occurred in a zone having redundancy, and communication is not affected; a high-influence state in which a failure has occurred in a zone having no redundancy or redundancy is lost due to a failure, and communication is affected; and a check-required state in which there is a possibility that an irregular failure occurs and affects communication.

4. The network monitoring apparatus according to claim 1,
wherein the processor is configured to perform operations comprising:
issuing the monitoring execution instruction in each predetermined monitoring cycle, and
aggregating the monitoring results in each predetermined aggregation cycle, and
wherein the aggregation cycles for the monitoring results are set to be equal to or longer than the monitoring cycles.

5. A network monitoring method implemented in a network monitoring apparatus that monitors a communication network including a plurality of leaf nodes, a plurality of spine nodes, and links connecting the leaf nodes and the spine nodes, the network monitoring method comprising:
generating network configuration information about the communication network;
setting a plurality of types of monitoring targets in the communication network, on a basis of the network configuration information;
issuing a monitoring execution instruction with respect to each of the monitoring targets, and collecting monitoring results; and
aggregating the monitoring results from respective monitoring targets, and determining a failure type of a failure and a degree of influence of the failure, on a basis of a type of the monitoring target having the failure and an occurring event,
wherein setting the monitoring targets comprises setting physical interfaces included in the leaf nodes and the spine nodes, the links connecting the leaf nodes and the spine nodes, transfer function units included in the spine nodes, and an overlay tunnel set between an originating-side leaf node and a terminating-side leaf node,
wherein aggregating the monitoring results comprises aggregating the monitoring results from the same physical location into a single notification in each aggregation cycle, and
wherein determining the failure type and the degree of influence of the failure comprises determining the failure type and the degree of influence of the failure using aggregation results over a plurality of aggregation cycles.

6. A non-transitory computer-readable medium storing program instructions that, when executed, cause a network monitoring apparatus to perform operations comprising:
generating network configuration information about a communication network monitored by the network monitoring apparatus, the communication network comprising a plurality of leaf nodes, a plurality of spine nodes, and links connecting the leaf nodes and the spine nodes;
a plurality of types of monitoring targets in the communication network, on a basis of the network configuration information;
issuing a monitoring execution instruction with respect to each of the monitoring targets, and collecting monitoring results; and
aggregating the monitoring results from respective monitoring targets, and determining a failure type of a failure and a degree of influence of the failure, on a basis of a type of the monitoring target having the failure and an occurring event,
wherein setting the monitoring targets comprises setting physical interfaces included in the leaf nodes and the spine nodes, the links connecting the leaf nodes and the spine nodes, transfer function units included in the spine nodes, and an overlay tunnel set between an originating-side leaf node and a terminating-side leaf node,
wherein aggregating the monitoring results comprises aggregating the monitoring results from the same physical location into a single notification in each aggregation cycle, and
wherein determining the failure type and the degree of influence of the failure comprises determining the failure type and the degree of influence of the failure using aggregation results over a plurality of aggregation cycles.

* * * * *